US011561340B2

(12) United States Patent
Hayashi et al.

(10) Patent No.: US 11,561,340 B2
(45) Date of Patent: Jan. 24, 2023

(54) MULTI-CORE OPTICAL FIBER AND MULTI-CORE OPTICAL FIBER CABLE

(71) Applicant: SUMITOMO ELECTRIC INDUSTRIES, LTD., Osaka (JP)

(72) Inventors: Tetsuya Hayashi, Osaka (JP); Tetsuya Nakanishi, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 17/446,503

(22) Filed: Aug. 31, 2021

(65) Prior Publication Data

US 2022/0066091 A1 Mar. 3, 2022

(30) Foreign Application Priority Data

Sep. 1, 2020 (JP) .............................. JP2020-146945

(51) Int. Cl.
*G02B 6/02* (2006.01)
*G02B 6/44* (2006.01)

(52) U.S. Cl.
CPC ..... *G02B 6/02042* (2013.01); *G02B 6/02066* (2013.01); *G02B 6/4403* (2013.01)

(58) Field of Classification Search
CPC ............ G02B 6/02042; G02B 6/02066; G02B 6/4403

(Continued)

(56) References Cited

U.S. PATENT DOCUMENTS 9,557,476 B2 1/2017 Matsuo et al.
2014/0334789 A1* 11/2014 Matsuo .............. G02B 6/02042
385/126

(Continued)

OTHER PUBLICATIONS

Matsui, Takashi et al., "Design of 125 µm cladding multi-core fiber with full-band compatibility to conventional single-mode fiber," Eur. Conf. Opt. Commun. (ECOC), the Internet URL:https://doi.org/10.1109/ECOC.2015.7341966, 2015.

(Continued)

*Primary Examiner* — Jerry M Blevins
(74) *Attorney, Agent, or Firm* — Faegre Drinker Biddle & Reath LLP

(57) ABSTRACT

An MCF having a structure excellent in mass productivity and suppressing increases in splicing cost and loss are provided. The MCF includes 12 or 16 cores, a cladding, and a coating. The cores are arranged at positions of line symmetry while no adjacent relationship is established between the cores having an adjacent relationship with any core. A coating diameter is 235-265 µm, a cladding diameter CD is from $CD_{nominal}-1$ µm to $CD_{nominal}+1$ µm with a nominal value $CD_{nominal}$ of 195 µm or less, an MFD at 1310 nm is from MFD-reference-value−0.4 µm to the MCF-reference-value+0.4 µm with the MFD-reference-value of 8.2-9.2 µm, and a 22 m-cable-cutoff wavelength $\lambda_{cc}$ is 1260-1360 nm. A core's zero-dispersion wavelength is a wavelength-reference-value−12 nm to the wavelength-reference-value+12 nm with the wavelength-reference-value of 1312-1340 nm, and a dispersion slope at the wavelength is 0.092 ps/(nm$^2$·km) or less. A shortest distance from a cover-cladding interface to each core center, a structure, and optical characteristics satisfy predetermined conditions.

10 Claims, 11 Drawing Sheets

(58) Field of Classification Search
USPC .......................................................... 385/114
See application file for complete search history.

(56) References Cited

U.S. PATENT DOCUMENTS

2018/0120501 A1 5/2018 Sasaki et al.
2020/0257040 A1 8/2020 Chen et al.

OTHER PUBLICATIONS

Geng, Ying et al., "High-speed, bi-directional dual-core fiber transmission system for high-density, short-reach optical interconnects," Proc. of SPIE, vol. 9390, 2015, p. 939009-1-p. 939009-10.

Matsui, Takashi et al., "Step-index profile multi-core fibre with standard 125 μm cladding to full-band application," Eur. Conf. Opt. Commun. (ECOC), the Internet URL:https://doi.org/10.1049/cp.2019.0751, 2019, p. 1-p. 4.

Sasaki, Yusuke et al., "High Density Multicore Fibers Employing Small MFD Cores for Datacenters," The 23rd OptoElectronics and Communications Conference (OECC 2018) Technical Digest, Jul. 2-6, 2018.

Sato, Fumiaki et al., "Characteristics of Ultra-High-Fiber-Count and High-Density Optical Cables with Pliable Ribbons," Proceedings of the 66th IWCS Conference, 2017, p. 304-p. 311.

Black, R. J. et al., "Developments in the theory of equivalent-step-index fibers," J. Opt. Soc. Am. A., Nov. 1984, vol. 1, No. 11, p. 1129-p. 1131.

Matsui, Takashi et al., "Zero-Dispersion Wavelength Optimized Single-Mode Multi-Core Fiber for High-Speed Gigabit Ethernet," Eur. Conf. Opt. Commun. (ECOC), 2017, p. W.1.B.

Hayashi, Tetsuya et al., "Crosstalk Characteristics of Multi-Core Fibers with Different Cladding Diameters in High-Density Optical Cable with Freeform Ribbons," Int. Wire Cable Symp. (IWCS2018), 2018, p. P-6.

* cited by examiner

MULTI-CORE OPTICAL FIBER AND MULTI-CORE OPTICAL FIBER CABLE

TECHNICAL FIELD

The present disclosure relates to a multi-core optical fiber (hereinafter, referred to as an "MCF") and a multi-core optical fiber cable (hereinafter, referred to as an "MCF cable").

The present application claims priority from Japanese Patent Application No. 2020-146945 filed on Sep. 1, 2020, which is based on the contents and all of which are incorporated herein by reference in their entirety.

BACKGROUND

At present, MCFs are actively studied as large-capacity optical transmission lines.

For example, Non-Patent Document 1 discloses a trench-assisted four-core fiber having a cladding outer diameter of 125 μm. The depth of the trench is about −0.7% or less, a mode field diameter (hereinafter, referred to as an "MFD") is 8.4 μm or more and 8.6 μm or less at a wavelength of 1310 nm. The cable cutoff wavelength is 1171 nm or more and 1195 nm or less. The zero-dispersion wavelength is 1317 nm or more and 1319 nm or less, and the chromatic dispersion slope at the zero-dispersion wavelength is 0.090 ps/(nm$^2$·km) or more and 0.091 ps/(nm$^2$·km) or less. In addition, the transmission loss is 0.33 dB/km or more and 0.35 dB/km or less at a wavelength of 1310 nm, and 0.19 dB/km or more and 0.21 dB/km or less at a wavelength of 1550 nm. The inter-core crosstalk (hereinafter, a crosstalk is referred to as an "XT") is −43 dB/km at a wavelength of 1625 nm.

Non-Patent Document 2 discloses a trenchless two-core fiber having a cladding outer diameter of 125 μm. The MFD is 8.1 μm at a wavelength of 1310 nm, and is 9.14 μm at the wavelength of 1550 nm. The inter-core XT at the time of propagation for 5.8 km is −79.3 dB at a wavelength of 1310 nm, is −48.3 dB at a wavelength of 1490 nm, and is −42.5 dB at the wavelength of 1550 nm. The cutoff wavelength is 1160 nm.

Non-Patent Document 3 also discloses a trenchless four-core fiber having a cladding outer diameter of 125 μm. The MFD is 8.6 μm or more and 8.8 μm or less at the wavelength of 1310 nm, and is 9.6 μm or more and 9.8 μm or less at the wavelength of 1550 nm. The cable cutoff wavelength is 1234 nm or more and 1244 nm or less. The zero-dispersion wavelength is 1318 nm or more and 1322 nm or less, and the chromatic dispersion slope at the zero-dispersion wavelength is 0.088 ps/(nm$^2$·km) or more and 0.089 ps/(nm$^2$·km) or less. The transmission loss is 0.328 dB/km or more and 0.330 dB/km or less at the wavelength of 1310 nm, is 0.188 dB/km or more and 0.193 dB/km or less at the wavelength of 1550 nm, and is 0.233 dB/km or more and 0.245 dB/km or less at a wavelength of 1625 nm. The inter-core XT is −56 dB/km or less on a 1360-nm wavelength band (O-band), and is −30 dB/km or less on a 1565-nm wavelength band (C-band).

Non-Patent Document 4 discloses a 12-core fiber having a cladding outer diameter of 147 μm and including cores arranged in a square lattice, and a 12-core fiber having a cladding outer diameter of 145 μm and cores arranged in a hexagonal lattice. The fibers each have a trenchless structure. The MFD is 5.4 μm at the wavelength of 1310 nm, and is 6.1 μm at the wavelength of 1550 nm. The cutoff wavelength is 1.26 μm, the zero-dispersion wavelength is 1.41 μm, the leakage loss to the coating at the wavelength of 1565 nm is 0.01 dB/2 kin, and the inter-core XT at the wavelength of 1565 nm is −30 dB/2 km.

Furthermore, Non-Patent Document 5 discloses an example of a 12-fiber ribbon as an ultra-high density optical fiber cable of an intermittent-bonding ribbon type.

(Non-Patent Document 1) Takashi Matsui, et al., "Design of 125 μm cladding multi-core fiber with full-band compatibility to conventional single-mode fiber," Eur. Conf. Opt. Commun. (ECOC) 2015, the Internet <URL:https://doi.org/10.1109/ECOC.2015.7341966>.

(Non-Patent Document 2) Ying Geng, et al., "High-speed, bidirectional, dual-core fiber transmission system for high-density, short-reach optical interconnects," Proc. SPIE, Vol. 9390 939009-1 (Mar. 9, 2015).

(Non-Patent Document 3) T. Matsui et al., "Step-index profile multi-core fibre with standard 125-μm cladding to full-band application," in Eur. Conf. Opt. Commun. (ECOC) (2019), the Internet <URL:https://doi.org/10.1049/cp.2019.0751>.

(Non-Patent Document 4) Yusuke Sasaki, et al., "High Density Multicore Fibers Employing Small MFD Cores for Datacenters," OECC2018 P2-07, Technical Digest Jul. 2-6, 2018.

(Non-Patent Document 5) Fumiaki Sato, et al., "Characteristics of Ultra-High-Fiber-Count and High-Density Optical Cables with Pliable Ribbons," Proceedings of the 66$^{th}$ IWCS Conference (2017), p. 304-311.

(Non-Patent Document 6) R. J. Black and C. Pask, J. Opt. Soc. Am. A, JOSAA 1(11), p. 1129-1131, 1984.

(Non-Patent Document 7) T. Matsui et al., in Eur. Conf. Opt. Commun. (ECOC 2017), p. W.1.B.2.

(Non-Patent Document 8) T. Hayashi et al., in Int. Wire Cable Symp. (IWCS) (2018), p. P-6.

SUMMARY

In order to solve the above-described problems, an MCF according to the present disclosure includes multiple cores, a common cladding, and a resin coating. The multiple cores include 12 cores or 16 cores each extending along a central axis. The common cladding covers each of the multiple cores. The resin coating is provided on an outer periphery of the common cladding. In addition, on a cross-section of the MCF orthogonal to the central axis, cores included in the multiple cores are arranged such that no adjacent relationship is established between the cores having an adjacent relationship with any core. In addition, on the cross-section, the multiple cores are respectively arranged at positions of line symmetry with respect to an axis, as a symmetric axis, that passes through a center of the common cladding intersecting with the central axis and that intersects with none of the multiple cores. An outer diameter of the resin coating defined on the cross-section is a value of 235 μm or more and 265 μm or less, and a diameter CD [μm] of the common cladding defined on the cross-section falls within a range of a value of $CD_{nominal}-1$ μm or more and a value of $CD_{nominal}+1$ μm or less with a value of 195 μm or less used as a nominal value $CD_{nominal}$ [μm]. An MFD at a wavelength of 1310 nm falls within a range of a value of an MFD reference value−0.4 μm or more and a value of the MFD reference value+0.4 μm or less with a value in a range of 8.2 μm or more and 9.2 μm or less used as the MFD reference value. A cable cutoff wavelength $\lambda_{cc}$ [nm] measured by a fiber length of 22 m is 1260 nm or less or 1360 nm or less. A zero-dispersion wavelength of each core of the multiple cores falls within a range of a value of a wavelength reference value−12 nm or more and a value of the wavelength reference value+12 nm or less with a value in a range of 1312 nm or more and 1340 nm or less used as the wavelength reference value. A dispersion slope at the zero-dispersion wavelength is 0.092 ps/(nm²·km) or less. Furthermore, in the MCF, a shortest distance $d_{coat}$ [μm] from an interface between the resin coating and the common cladding to centers of the multiple cores, a structure, and optical characteristics satisfy predetermined conditions.

DETAILED DESCRIPTION

Figure 1:
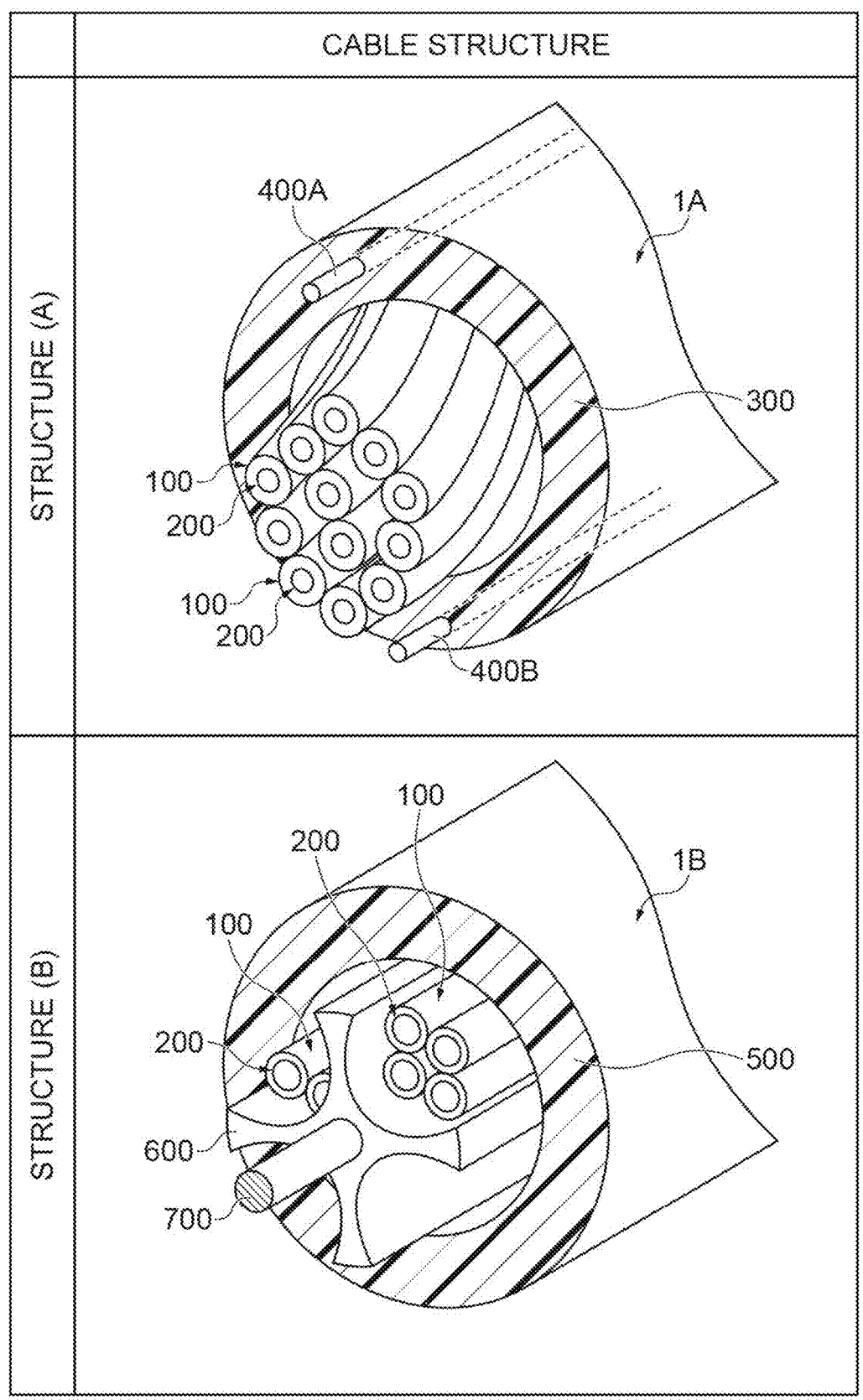
FIG. 1 is a diagram illustrating various structures of an MCF cable (including an MCF according to the present disclosure) according to the present disclosure.

Problems to be Solved by the Present Disclosure

The inventors have studied the above-described conventional techniques and found the following problems. That is, the conventional MCFs are remarkably poor in mass productivity and is high in manufacturing cost, as compared with general-purpose single-mode fibers (hereinafter, a single-mode fiber is referred to as an "SMF"). This is because it is necessary to provide a trench layer having a low refractive index that is large in relative refractive index difference between the cladding and each core as disclosed in the above-described Non-Patent Document 1 in order to simultaneously achieve an XT reduction, an increase in the number of cores, a reduction in the cladding outer diameter, and an increase in the MFD in each core.

In addition, regarding the conventional MCFs, it takes time to perform fusion splicing (an increase in work costs). In the conventional fiber ribbon cable, as disclosed above in Non-Patent Document 1, 12 or more and 16 or less fibers are incorporated in a single fiber ribbon, and these fibers can be collectively spliced. On the other hand, since axial rotational alignment is needed for the MCF, a fusion work is needed for each fiber. However, as disclosed in Non-Patent Document 1 to Non-Patent Document 3, in a case where the number of cores per MCF is two or more and four or less, it takes three to eight times a time that of the fusion of a fiber ribbon incorporating 12 or more and 16 or less fibers, even if a time increase due to the axial rotational alignment is ignored.

Furthermore, in the conventional MCFs, a splice loss is largely degraded. In order to incorporate lots of cores into a "not too thick" cladding, it is necessary to drastically reduce the MFD as compared with the general-purpose SMF as disclosed in Non-Patent Document 4. In the MFD in the fiber in the above-described Non-Patent Document 4, the splice loss caused by an axis deviation at 5.4 μm (1310 nm) at a wavelength of 1310 nm is degraded 2.54 times as compared with the splice loss caused by the axis deviation in the general-purpose SMF having an MFD nominal value of 8.6 μm (for example, a splice having a splice loss that has been 0.5 dB or less is degraded to a splice loss of 1.27 dB or less, and a splice having a splice loss that has been 0.35 dB or less is degraded to a splice loss of 0.89 dB or less).

Regarding the mass productivity, the conventional MCFs are extremely low. In the above-described Non-Patent Document 1, Non-Patent Document 3, and Non-Patent Document 4, the tolerance of the refractive index distribution of each core is not sufficiently considered, and therefore degrades the manufacturing yield.

The present disclosure has been made to solve the above-described problems, and an object of the present disclosure is to provide a multi-core optical fiber and a multi-core optical fiber cable that are excellent in mass productivity and that respectively have structures for suppressing an increase in splice cost and transmission loss.

Advantageous Effect of the Present Disclosure

According to the MCF and the MCF cable in the present disclosure, the mass productivity is improved, and an increase in the splice cost and the transmission loss can be effectively suppressed.

DESCRIPTION OF EMBODIMENTS OF THE PRESENT DISCLOSURE

First, contents of embodiments in the present disclosure will be individually listed and described.

(1) An MCF according to one aspect of the present disclosure includes multiple cores, a common cladding, and a resin coating. The multiple cores include 12 cores or 16 cores each extending along a central axis. Note that in describing both a 12-core MCF in which 12 cores are arranged to constitute the square lattice and a 16-core MCF in which 16 cores are arranged to constitute the square lattice, they will be simply referred to as an "MCF according to the present disclosure". The common cladding covers each core of the multiple cores. The resin coating is provided on an outer periphery of the common cladding. In addition, on a cross-section of the MCF orthogonal to the central axis, the multiple cores are arranged such that no adjacent relationship is established between the cores having an adjacent relationship with any core. In addition, on the cross-section, the multiple cores are respectively arranged at positions of line symmetry with respect to an axis, as a symmetric axis, that passes through a center of the common cladding intersecting with the central axis and that intersects with none of the multiple cores. An outer diameter of the resin coating defined on the cross-section falls within a range of 235 μm or more and 265 μm or less, and a diameter CD [μm] of the common cladding defined on the cross-section falls within a range of a value of $CD_{nominal}-1$ μm or more and a value of $CD_{nominal}+1$ μm or less with a value of 195 μm or less used as a nominal value $CD_{nominal}$ [μm]. The MFD [μm] at a wavelength of 1310 nm falls within a range of a value of a wavelength reference value−0.4 μm or more and a value of the wavelength reference value+0.4 μm or less with a value in a range of 8.2 μm or more and 9.2 μm or less used as the wavelength reference value. A cable cutoff wavelength $\lambda_{cc}$ [nm] measured by a fiber length of 22 m is 1260 nm or less or 1360 nm or less. A zero-dispersion wavelength of each core of the multiple cores falls within a range of a value of a wavelength reference value−12 nm or more and a value of the wavelength reference value+12 nm or less with a value in a range of 1312 nm or more and 1340 nm or less used as the wavelength reference value. A dispersion slope at the zero-dispersion wavelength is 0.092 ps/(nm²·km) or less.

Further, in the MCF, a shortest distance $d_{coat}$ [μm] of respective distances from an interface between the resin coating and the common cladding to centers of the multiple cores satisfies a following Formula (1):

$$d_{coat} \geq 2.88 MFD/\lambda_{cc} + 5.36. \tag{1}$$

In addition, the MCF has a structure satisfying one of a first condition and second condition in the following, and has an optical characteristic satisfying any one of a third condition to a sixth condition in the following.

In particular, the above-described first condition is defined such that each of the multiple cores is in direct contact with the common cladding. The above-described second condition is defined such that optical claddings respectively corresponding to the multiple cores are respectively disposed between the multiple cores and the common cladding, and the optical claddings each have a relative refractive index difference Δ2 of −0.1% or more and 0.1% or less with respect to the common cladding.

On the other hand, the above-described third condition is defined such that the multiple cores include the 12 cores, for each of the 12 cores, a total XT (a total crosstalk) from the cores having the adjacent relationship at a wavelength of 1360 nm is −6.8 dB/10 km or less, and a center-to-center interval Λ between the cores having the adjacent relationship satisfies a following Formula (2):

$$\Lambda \geq 2.34 MFD/\lambda_{cc} + 12.1 \tag{2}$$

and the MCF satisfies a following Formula (3):

$$CD_{nominal} \geq 13.15 MFD/\lambda_{cc} + 54.25. \tag{3}$$

The above-described fourth condition is defined such that the multiple cores include the 12 cores, for each of the 12 cores, the total XT from the cores having the adjacent relationship at the wavelength of 1360 nm is −16.8 dB/10 km or less, and the center-to-center interval Λ between the cores having the adjacent relationship satisfies a following Formula (4):

$$\Lambda \geq 2.73 MFD/\lambda_{cc} + 12.7 \tag{4}$$

and the MCF satisfies a following Formula (5):

$$CD_{nominal} \geq 14.07 MFD/\lambda_{cc} + 55.59. \tag{5}$$

The above-described fifth condition is defined such that the multiple cores include the 16 cores, for each of the 16 cores, the total XT from the cores having the adjacent relationship at the wavelength of 1360 nm is −6.8 dB/10 km or less, and the center-to-center interval Λ between the cores having the adjacent relationship satisfies a following Formula (6):

$$\Lambda \geq 2.34 MFD/\lambda_{cc} + 12.1 \tag{6}$$

and the MCF satisfies a following Formula (7):

$$CD_{nominal} \geq 15.77 MFD/\lambda_{cc} + 68.58. \tag{7}$$

The above-described sixth condition is defined such that the multiple cores include the 16 cores, for each of the 16 cores, the total XT from the cores having the adjacent relationship at the wavelength of 1360 nm is −16.8 dB/10 km or less, and the center-to-center interval Λ between the cores having the adjacent relationship satisfies a following Formula (8):

$$\Lambda \geq 2.73 MFD/\lambda_{cc} + 12.7 \tag{8}$$

and the MCF satisfies a following Formula (9):

$$CD_{nominal} \geq 17.01 MFD/\lambda_{cc} + 70.37. \tag{9}$$

As described above, the MCF includes multiple cores including 12 cores or 16 cores. This structure enables splicing of number of cores of a 12-fiber ribbons or more per fusion. An outer diameter of the resin coating defined on the cross-section of the MCF is a value of 235 μm or more and 265 μm or less. In this case, a coating diameter similar to that of the general-purpose SMF is achievable. In addition, the diameter CD [μm] of the common cladding defined on the cross-section of the MCF falls within a range of a value of $CD_{nominal}-1$ μm or more and a value of $CD_{nominal}+1$ μm or less with a value of 195 μm or less used as a nominal value $CD_{nominal}$ [μm]. Accordingly, a coating thickness with a proved success is achievable while the possibility of damage in glass cladding that is the common cladding is being suppressed.

The MFD at a wavelength of 1310 nm falls within a range of a value of an MFD reference value−0.4 μm or more and a value of the MFD reference value+0.4 μm or less with a value in a range of 8.2 μm or more and 9.2 μm or less used as the MFD reference value. In this case, an increase in the splice loss can be effectively suppressed. A cable cutoff wavelength $\lambda_{cc}$ [nm] measured by a fiber length of 22 m is 1260 nm or less or 1360 nm or less. A zero-dispersion wavelength of each core of the multiple cores falls within a range of a value of a wavelength reference value−12 nm or more and a value of the wavelength reference value+12 nm or less with a value in a range of 1312 nm or more and 1340 nm or less used as the wavelength reference value. A dispersion slope at the zero-dispersion wavelength is 0.092 ps/(nm²·km) or less.

The MCF has a structure satisfying the above-described first condition or the above-described second condition (a trench layer having a small relative refractive index difference with respect to the common cladding may be provided, but the trench layer is not substantially included), and therefore a fiber structure excellent in mass productivity is obtained. In addition, the MCF satisfies the above-described third condition in a case where the multiple cores of the MCF includes 12 cores, and satisfies the above-described fifth condition in a case where the multiple cores of the MCF includes 16 cores, the total amount of the counter propagation XT to a predetermined core after the propagation for 10 km (corresponding to the fiber length of 10 km) is suppressed to −20 dB (−20 dB/10 km). On the other hand, the MCF satisfies the above-described fourth condition in a case where the multiple cores of the MCF includes 12 cores, and satisfies the above-described sixth condition in a case where the multiple cores of the MCF includes 16 cores, the total amount of counter propagation XT to a predetermined core after the propagation for 10 km (corresponding to the fiber length of 10 km) is suppressed to −40 dB (−40 dB/10 km).

Note that at the wavelength of 1550 nm, the total crosstalk corresponding to the fiber length of 10 km from a core having an adjacent relationship may be −15 dB or more.

(2) According to one aspect of the present disclosure, in a configuration in which the multiple cores of the MCF includes 12 cores, the 12 cores each belong to one of an outer peripheral core group including outermost peripheral cores to be arranged such that the distance from the interface between the resin coating and the common cladding to the center of each core is the shortest in a design, and an inner peripheral core group including cores surrounded by the outermost peripheral cores. The MFD [μm] preferably fall within a range of 8.2 μm or more and 9.0 μm or less at a wavelength of 1310 nm. The cable cutoff wavelength $\lambda_{cc}$ [nm] is preferably 1260 nm or less. Further, the MCF preferably satisfies any one of the following Formulas (10) to (14):

$$6.5 \leq MFD/\lambda_{cc} \leq 7.5 \leq 0.07606 CD_{nominal} - 4.126; \tag{10}$$

$$6.5 \leq MFD/\lambda_{cc} \leq 8.0 \leq 0.07606 CD_{nominal} - 4.126; \tag{11}$$

$$6.5 \leq MFD/\lambda_{cc} \leq 8.4 \leq 0.07606 CD_{nominal} - 4.126; \tag{12}$$

$$6.5 \leq MFD/\lambda_{cc} \leq 9.0 \leq 0.07606 CD_{nominal} - 4.126; \text{ and} \tag{13}$$

$$6.5 \leq MFD/\lambda_{cc} \leq 9.5 \leq 0.07606 CD_{nominal} - 4.126. \tag{14}$$

With this configuration, an MCF excellent in mass productivity and capable of effectively suppressing an increase in splice cost and transmission loss is obtainable.

(3) According to one aspect of the present disclosure, in the configuration in which the multiple cores of the MCF includes 12 cores, the 12 cores each belong to one of an outer peripheral core group including outermost peripheral cores to be arranged such that the distance from the interface between the resin coating and the common cladding to the center of each core is the shortest in a design, and an inner peripheral core group including cores surrounded by the outermost peripheral cores, and the total XT to any core that belongs to the inner peripheral core group is preferably −16.8 dB/10 km or less at the wavelength of 1360 μm. The MFD [μm] preferably fall within a range of 7.8 μm or more and 8.6 μm or more, at a wavelength of 1310 nm. The cable cutoff wavelength $\lambda_{cc}$ [nm] is preferably 1260 nm or less. Further, the MCF preferably satisfies any one of the following Formulas (15) to (19):

$$6.2 \leq MFD/\lambda_{cc} \leq 7.2 \leq 0.07105 CD_{nominal} - 3.950; \tag{15}$$

$$6.2 \leq MFD/\lambda_{cc} \leq 7.7 \leq 0.07105 CD_{nominal} - 3.950; \tag{16}$$

$$6.2 \leq MFD/\lambda_{cc} \leq 8.1 \leq 0.07105 CD_{nominal} - 3.950; \tag{17}$$

$$6.2 \leq MFD/\lambda_{cc} \leq 8.7 \leq 0.07105 CD_{nominal} - 3.950; \text{ and} \tag{18}$$

$$6.2 \leq MFD/\lambda_{cc} \leq 9.2 \leq 0.07105 CD_{nominal} - 3.950. \tag{19}$$

With this configuration, an MCF excellent in mass productivity and capable of effectively suppressing an increase in splice cost and transmission loss is obtainable.

(4) According to one aspect of the present disclosure, the MFD preferably fall within a range of 8.2 μm or more and 9.0 μm or less, at a wavelength of 1310 nm. The multiple cores of the MCF each belong to one of an outer peripheral core group including outermost peripheral cores to be arranged such that the distance from the interface between the resin coating and the common cladding to the center of each core is the shortest in a design and cores located on a straight line connecting the centers of the outermost peripheral cores having an adjacent relationship, and an inner peripheral core group including cores surrounded by the cores that belong to the outer peripheral core group, and the total XT to any core that belongs to the inner peripheral core group is preferably −16.8 dB/10 km or less at the wavelength of 1360 nm. The cable cutoff wavelength $\lambda_{cc}$ [nm] is preferably 1360 nm or less. Further, the MCF preferably satisfies any one of the following Formulas (20) to (24):

$$6.0 \leq MFD/\lambda_{cc} \leq 7.0 \leq 0.07105 CD_{nominal} - 3.950; \quad (20)$$

$$6.0 \leq MFD/\lambda_{cc} \leq 7.5 \leq 0.07105 CD_{nominal} - 3.950; \quad (21)$$

$$6.0 \leq MFD/\lambda_{cc} \leq 7.9 \leq 0.07105 CD_{nominal} - 3.950; \quad (22)$$

$$6.0 \leq MFD/\lambda_{cc} \leq 8.5 \leq 0.07105 CD_{nominal} - 3.950; \text{ and} \quad (23)$$

$$6.0 \leq MFD/\lambda_{cc} \leq 9.0 \leq 0.07105 CD_{nominal} - 3.950. \quad (24)$$

Also with such a configuration, an MCF excellent in mass productivity and capable of effectively suppressing an increase in splice cost and transmission loss is obtainable.

(5) The MCF cable according to the present disclosure preferably includes a plurality of MCFs including an MCF having the above-described structure (the MCF according to the present disclosure). With this configuration, the MCF cable excellent in mass productivity and capable of effectively suppressing an increase in splice cost and transmission loss is obtainable. Note that the MCF cable may incorporate a multi-core optical fiber ribbon in which a plurality of MCFs are intermittently bonded. In addition, the MCF cable may include the multi-core optical fiber having an average bending radius of 0.03 m or more and 0.14 m or less, or 0.14 m or more and 0.3 m or less in a fiber longitudinal direction.

Heretofore, each aspect listed in the section of [Descriptions of Embodiments of the Present Disclosure] is applicable to each of all the remaining aspects or to all combinations of these remaining aspects.

DETAILS OF EMBODIMENTS OF THE PRESENT DISCLOSURE

Specific examples of a multi-core optical fiber (MCF) and a multi-core optical fiber cable (MCF cable) according to the present disclosure will be described in detail below with reference to the accompanying drawings. Note that the present disclosure is not limited to these examples, but is indicated by the claims, and is intended to include all modifications within the meaning and scope equivalent to the claims. In addition, in the description of the drawings, the same elements are denoted by the same reference numerals, and duplicated descriptions will be omitted.

FIG. 1 is a diagram illustrating various structures of an MCF cable (including an MCF according to the present disclosure) according to the present disclosure.

An MCF cable 1A having a structure (A) includes an outer sheath 300 including an MCF accommodation space extending in a longitudinal direction of the MCF cable 1A, and a plurality of MCFs 100 (MCFs according to the present disclosure). In the outer sheath 300, two tension members 400A and 400B extending along the MCF accommodation space are embedded. The MCFs 100 each includes a glass fiber 200, the outer peripheral surface of which is covered with a resin coating.

On the other hand, an MCF cable 1B having a structure (B) includes an outer sheath 500 including an MCF accommodation space extending in a longitudinal direction of the MCF cable 1B, a slotted core 600 that divides the MCF accommodation space into a plurality of spaces, and a plurality of MCFs 100 (MCFs according to the present disclosure). The slotted core 600 that divides the MCF accommodation space into the plurality of spaces is accommodated inside the outer sheath 500. A tension member 700 extending in a longitudinal direction of the MCF cable 1B is embedded in the slotted core 600. The plurality of MCFs 100 are accommodated in any one of the spaces divided by the slotted core 600. In both of the structures (A) and (B), the plurality of MCFs 100 can constitute a plurality of multi-core optical fiber ribbons each obtained by intermittently bonding some MCFs of the plurality of MCFs 100.

Figure 2:
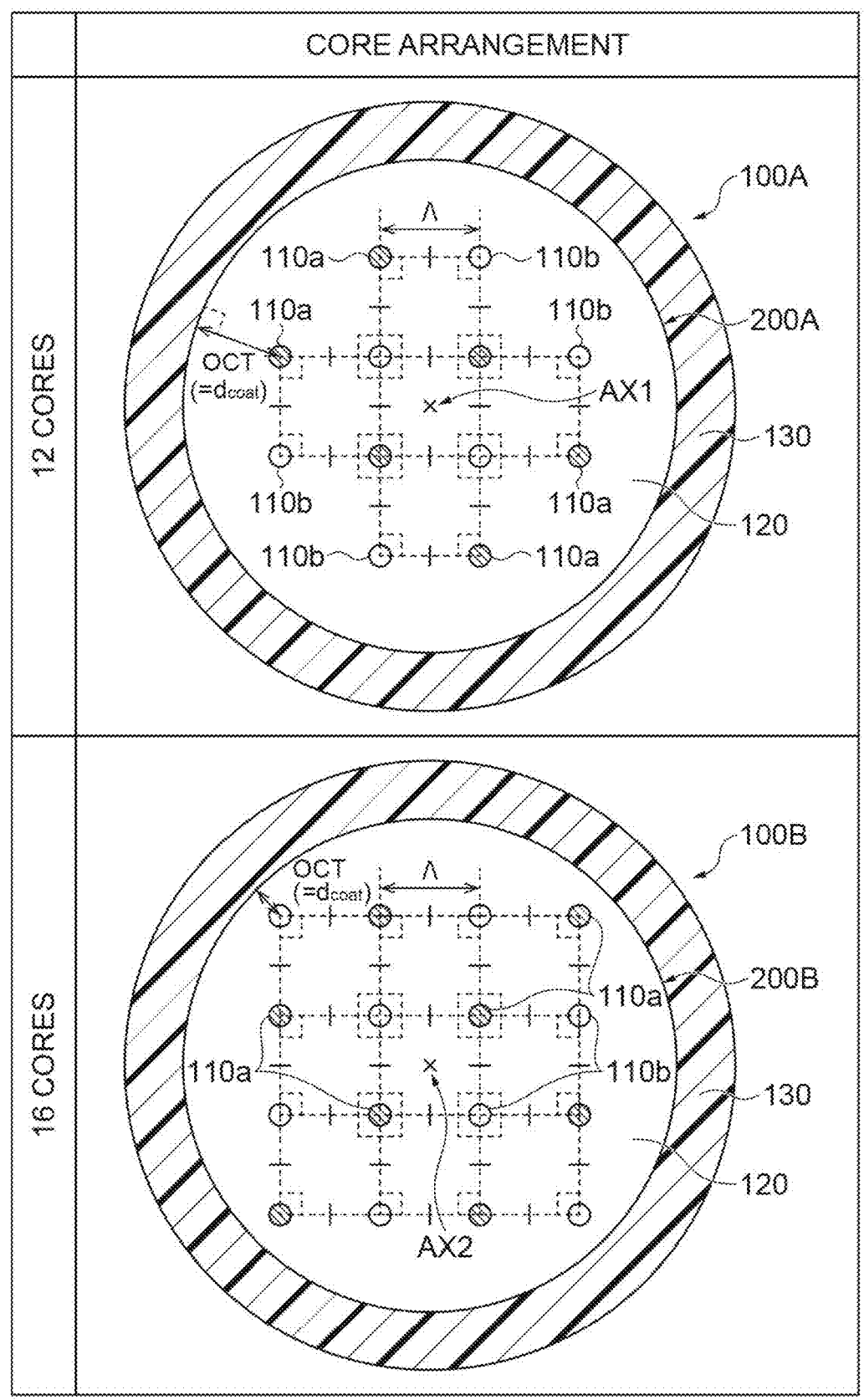
FIG. 2 is a diagram illustrating various core arrangements in the MCF according to the present disclosure.

FIG. 2 is a diagram illustrating various core arrangements in the MCF according to the present disclosure. In particular, the upper part of FIG. 2 illustrates a cross-sectional view of a 12-core MCF 100A (an MCF 100 according to the present disclosure) in which 12 cores are arranged to constitute the square lattice, and the lower part illustrates a cross-sectional view of a 16-core MCF 100B (the MCF 100 according to the present disclosure) in which 16 cores are arranged to constitute the square lattice.

The cross-section of the cross-sectional view of the 12-core MCF 100A (100) illustrated in the upper part is a cross-section orthogonal to the central axis extending in the longitudinal direction of the 12-core MCF 100A. The 12-core MCF 100A includes a glass fiber 200A and a resin coating 130 provided on the outer periphery of the glass fiber 200A. The glass fiber 200A includes 12 cores and a common cladding 120 covering the respective cores, and an outer peripheral surface of the glass fiber 200A and an outer peripheral surface of the common cladding 120 coincide with each other. Each of the 12 cores is one of a first core 110$a$ for propagating light in a predetermined direction and a second core 110$b$ for propagating light in a direction opposite to that of the first core 110$a$.

In the core arrangement illustrated in the upper part, each of the 12 cores (including the first cores 110$a$ and the second cores 110$b$) belongs to one of an outer peripheral core group including outermost peripheral cores (eight cores in the example in the upper part of FIG. 2) to be arranged such that the distance from the interface between the resin coating 130 and the common cladding 120 to the center of each core is the shortest in design (in the upper part of FIG. 2, the distance indicated by OCT (=$d_{coat}$)), and an inner peripheral core group including cores surrounded by the outermost peripheral cores. That is, in the example illustrated in the upper part of FIG. 2, the inner peripheral core group includes four cores (two first cores 110$a$ and two second cores 110$b$) constituting a minimum square lattice surrounding a center AX1 of the common cladding 120.

On the other hand, the cross-sectional view of the 16-core MCF 100B (100) illustrated in the lower part is a cross-section orthogonal to the central axis extending in the longitudinal direction of the 16-core MCF 100B. The 16-core MCF 100B includes a glass fiber 200B and a resin coating 130 provided on the outer periphery of the glass fiber 200B. The glass fiber 200B includes 16 cores and the common cladding 120 that covers the respective cores, and an outer peripheral surface of the glass fiber 200B and an outer peripheral surface of the common cladding 120 coincide with each other. Each of the 16 cores is one of the first core 110a for propagating light in a predetermined direction and the second core 110b for propagating light in a direction opposite to that of the first core 110a.

In the core arrangement illustrated in the lower part, each of the 16 cores (including the first cores 110a and the second cores 110b) belongs to one of an outer peripheral core group including outermost peripheral cores (four cores in the example in the lower part of FIG. 2) to be arranged such that the distance from the interface between the resin coating 130 and the common cladding 120 to the center of each core is the shortest (in the lower part of FIG. 2, the distance indicated by OCT (=$d_{coat}$)) in design and cores (eight cores in the example in the lower part of FIG. 2) located on a straight line connecting the centers of the outermost peripheral cores having an adjacent relationship, and an inner peripheral core group including cores surrounded by the cores that belong to the outer peripheral core group. Also in the example illustrated in the lower part of FIG. 2, the inner peripheral core group includes four cores (two first cores 110a and two second cores 110b) constituting a minimum square lattice surrounding a center AX2 of the common cladding 120. Note that, in the case that the definition of the outer peripheral core group illustrated in the upper part of FIG. 2 (a core arrangement including 12 cores) is applied to the example described in the lower part of FIG. 2 (a core arrangement including 16 cores), the number of the outermost peripheral cores is eight, and there is no core located on straight lines respectively connecting the centers of the outermost peripheral cores.

Note that, in both the case of the 12-core MCF 100A in the upper part and the case of the 16-core MCF 100B in the lower part, a center-to-center interval Λ is the same between all the adjacent cores. However, there may be a variation within a predetermined range from the nominal value $Λ_{nominal}$ of Λ. This configuration enables an increase in manufacturing tolerance.

Figure 3:
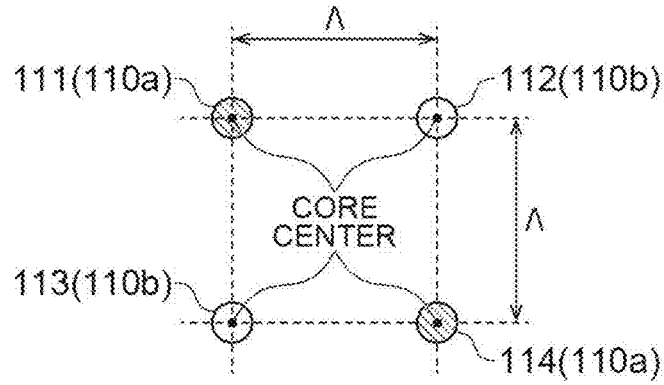
FIG. 3 is a diagram for describing main terms used in the present specification.

FIG. 3 is a diagram for describing main terms (adjacent relationship, cross-sectional structure around core, parallel propagation and parallel propagation XT (crosstalk), and counter propagation and counter propagation XT (crosstalk)) used in the present specification.

(Adjacent Relationship)

In the present specification, regarding an adjacent relationship between the cores, in a case where attention is focused on a specific core of 12 cores or 16 cores arranged on the cross-section of the MCF, a core having a minimum center-to-center interval with respect to such a specific core and a difference from the minimum center-to-center interval of 2 μm or less is defined as a core having an adjacent relationship with such a specific core. That is, as illustrated in FIG. 3, in a case where a core 111 (110a) is set as a specific core, a core 112 (110b) and a core 113 (110b) are the cores having an adjacent relationship with the core 111. Note that the cores are arranged to constitute the square lattice in both the 12-core MCF 100A and the 16-core MCF 100B described above. Therefore, the adjacent relationship is not established between the core 112 (110b) and the core 113 (110b) as illustrated in FIG. 3. However, a core 114 (110a) has an adjacent relationship with both the core 112 (110b) and the core 113 (110b).

(Cross-Sectional Structure Around Core)

In both the 12-core MCF 100A and the 16-core MCF 100B, in the cross-sectional structure around each core (the first core 110a or the second core 110b), the common cladding 120 surrounds the outer peripheries of the first core 110a or the second core 110b. The common cladding 120 may be provided to be in direct contact with the first core 110a or the second core 110b. However, an optical cladding 121 may be provided between the common cladding 120 and the first core 110a or the second core 110b. In addition, a trench layer 122 having a small relative refractive index difference Δ3 may be provided between the optical cladding 121 and the common cladding 120. Note that the optical cladding 121 is prepared for each core, and has a relative refractive index difference Δ2 of −0.1% or more and 0.1% or less with respect to the refractive index of the common cladding 120. Further, in a case where the trench layer 122 is provided, the trench layer 122 preferably has a relative refractive index difference Δ3 of −0.4% or more and less than 0% with respect to the refractive index of the common cladding.

(Parallel Propagation and Parallel Propagation XT)

In the example illustrated in FIG. 3, three cores (first cores 110a each propagating light in an identical direction) in which adjacent relationships are established are illustrated. That is, the adjacent relationship is established between the left core and the center core, and the adjacent relationship is established between the center core and the right core. That is, a state in which the cores each having the adjacent relationship propagate light in the identical direction is referred to as "parallel propagation". In this case, a general inter-core XT (parallel propagation XT) is generated between the adjacent cores that propagate light in the identical direction.

(Counter Propagation and Counter Propagation XT)

On the other hand, in counter propagation, light is propagated in directions different from each other between two cores in which the adjacent relationship is established. That is, in the example of FIG. 3, the adjacent relationship is established between the left core and the center core. However, the left core functions as the first core 110a, and the center core functions as the second core 110b that propagates light in a direction different from that of the first core 110a. The general XT generated between the left core and the center core hardly affects the communication quality. In a similar manner, the right core having the adjacent relationship with the center core functions as the first core 110a, and the general XT generated between the right core and the center core hardly affects the communication quality. In this manner, a state in which the cores between which the adjacent relationship is established the cores propagate light in different directions from each other is referred to as "counter propagation". However, between the left core and the right core (both of which function as the first cores 110a), the XT affects the communication quality via the center core (which functions as the second core 110b). In this manner, the XT between the cores that propagate the light in the identical direction via the core that establishes the adjacent relationship and that propagates the light in the opposite direction is referred to as "counter propagation XT".

Note that in the following description, a description will be given with reference to examples of "parallel propagation" and "counter propagation" illustrated in FIG. 3. However, in a case where $XT_{co}(L1)$ represents an XT (parallel propagation XT: $XT_{co}$) between the cores between which the adjacent relationship is established (hereinafter, referred to as an "adjacent core") at a fiber length L1, and the XT is represented in decibel value, the XT can be expressed in the following Formula (25):

$$XT_{co}(L2) = XT_{co}(L1) + 10\log_{10}(L2/L1). \tag{25}$$

The XT increases by 10 dB at a distance of 10 times.

In a case where the XT is represented in decibel value, for example, in the example of the counter propagation illustrated in FIG. 3, the XT (the counter propagation XT:

$XT_{counter}$) from the right core to the left core via the center core can be expressed in the following Formula (26):

$$XT_{counter} = 2XT_{co} - 10\log_{10} 2, \quad (26)$$

the Formula (26) using parallel propagation XT: $XT_{co}$ between the left core and the center core and between the center core and the right core.

In a case where $XT_{counter}(L1)$ represents a counter propagation XT at the fiber length L1, and the XT is represented in decibel value, the counter propagation XT at a fiber length L2 can be expressed in the following Formula (27):

$$XT_{counter}(L2) = XT_{counter}(L1) + 20\log_{10}(L2/L1). \quad (27)$$

The $XT_{counter}$ increases by 20 dB at a distance of 10 times.

A total $XT_{co,tot}$ of $XT_{co}$ from an adjacent core to a predetermined core is calculated in the following Formula (28):

$$XT_{co,tot} = XT_{co} + 10\log_{10} N, \quad (28)$$

in a case where N represents the number of adjacent cores to the predetermined core.

The above Formula (28) is presupposed that $XT_{co}$ between the adjacent cores is uniform. In a case where a difference in $XT_{co}$ between the adjacent cores is not negligible, and $XT_{co,n}$ represents $XT_{co}$ from a core n of N adjacent cores to the predetermined core, the total $XT_{co,tot}$ is expressed in the following Formula (28a):

$$XT_{co,tot} = 10\log_{10}\left(\sum_{n}^{N} 10^{\frac{XT_{co,n}}{10}}\right). \quad (28a)$$

Regarding a total $XT_{counter,tot}$ of the counter propagation XT to the predetermined core, in a case where M represents the number of "adjacent cores of the adjacent core (corresponding to the right core in the example of the counter propagation illustrated in FIG. 3, in a case where the predetermined core is the left core)", the predetermined core might also be calculated in the following Formula (29):

$$XT_{counter,tot} = XT_{counter} + 10\log_{10} M = 2XT_{co} - 10\log_{10} 2 + 10\log_{10} M. \quad (29)$$

However, the fact is different, and inventors have discovered that in a case where $K_n$ represents the number of adjacent cores (including the predetermined core) with respect to the core n of the N adjacent cores (the center core) of the predetermined core (the left core), $XT_{counter,tot}$ is expressed in the following Formula (30):

$$XT_{counter,tot} = XT_{counter} + 10\log_{10}\sum_{n=1}^{N}(K_n - 1) = \\ 2XT_{co} - 10\log_{10} 2 + 10\log_{10}\sum_{n=1}^{N}(K_n - 1). \quad (30)$$

Therefore, in the 16-core MCF, $XT_{counter,tot}$ to any of the four cores (the inner peripheral core group) located near the center can be expressed in the following Formula (31):

$$XT_{counter,tot} = XT_{counter} + 10\log_{10} 10 = 2XT_{co} + 10\log_{10}\frac{10}{2}. \quad (31)$$

In the 12-core MCF, $XT_{counter,tot}$ to any of the four cores that belong to the inner peripheral core group can be expressed in the following Formula (32):

$$XT_{counter,tot} \le XT_{counter} + 10\log_{10} 8 = 2XT_{co} + 10\log_{10}\frac{8}{2}. \quad (32)$$

For this reason, in the 12-core MCF, in order to set the counter propagation XT after the propagation for 10 km (corresponding to the fiber length of 10 km) to −20 dB (=−20 dB/10 km) or less, the parallel propagation XT ($XT_{co}$) between the adjacent cores in terms of a fiber length L (km) is preferably expressed in the following Formula (33):

$$XT_{co}(L) \le -12.8 + 10\log_{10}\frac{L}{10}. \quad (33)$$

In addition, the total parallel propagation XT from four cores each having an adjacent relationship with any one of the four cores that belong to the inner peripheral core group is preferably expressed in the following Formula (34):

$$XT_{co,tot}(L) \le -6.8 + 10\log_{10}\frac{L}{10}. \quad (34)$$

In the 12-core MCF, in order to set the counter propagation XT after the propagation for 10 km (corresponding to the fiber length of 10 kin) to −40 dB (=−40 dB/10 km) or less, the parallel propagation XT ($XT_{co}$) between the adjacent cores in terms of the fiber length L (km) is preferably expressed in the following Formula (35):

$$XT_{co}(L) \le -22.8 + 10\log_{10}\frac{L}{10}. \quad (35)$$

In addition, the total parallel propagation XT from four cores each having an adjacent relationship with any one of the four cores that belong to the inner peripheral core group is preferably expressed in the following Formula (36):

$$XT_{co,tot}(L) \le -16.8 + 10\log_{10}\frac{L}{10}. \quad (36)$$

On the other hand, in the 16-core MCF, in order to set the counter propagation XT after the propagation for 10 km (corresponding to the fiber length of 10 km) to −20 dB (=−20 dB/10 km) or less, the parallel propagation XT ($XT_{co}$) between the adjacent cores in terms of the fiber length L (km) is preferably expressed in the following Formula (37):

$$XT_{co}(L) \le -13.5 + 10\log_{10}\frac{L}{10}. \quad (37)$$

In addition, the total parallel propagation XT from four cores each having an adjacent relationship with any one of the four cores that belong to the inner peripheral core group is preferably expressed in the following Formula (38):

$$XT_{co,tot}(L) \le -7.5 + 10\log_{10}\frac{L}{10}. \quad (38)$$

In the 16-core MCF, in order to set the counter propagation XT after the propagation for 10 km (corresponding to the fiber length of 10 kin) to −40 dB (=−40 dB/10 km) or less, the parallel propagation XT ($XT_{co}$) between the adjacent cores in terms of the fiber length L (km) is preferably expressed in the following Formula (39):

$$XT_{co}(L) \le -23.5 + 10\log_{10}\frac{L}{10}. \quad (39)$$

In addition, the total parallel propagation XT from the four cores each having an adjacent relationship with any one of the four cores that belong to the inner peripheral core group is preferably expressed in the following Formula (40):

$$XT_{co,tot}(L) \le -17.5 + 10\log_{10}\frac{L}{10}. \quad (40)$$

Figure 4:
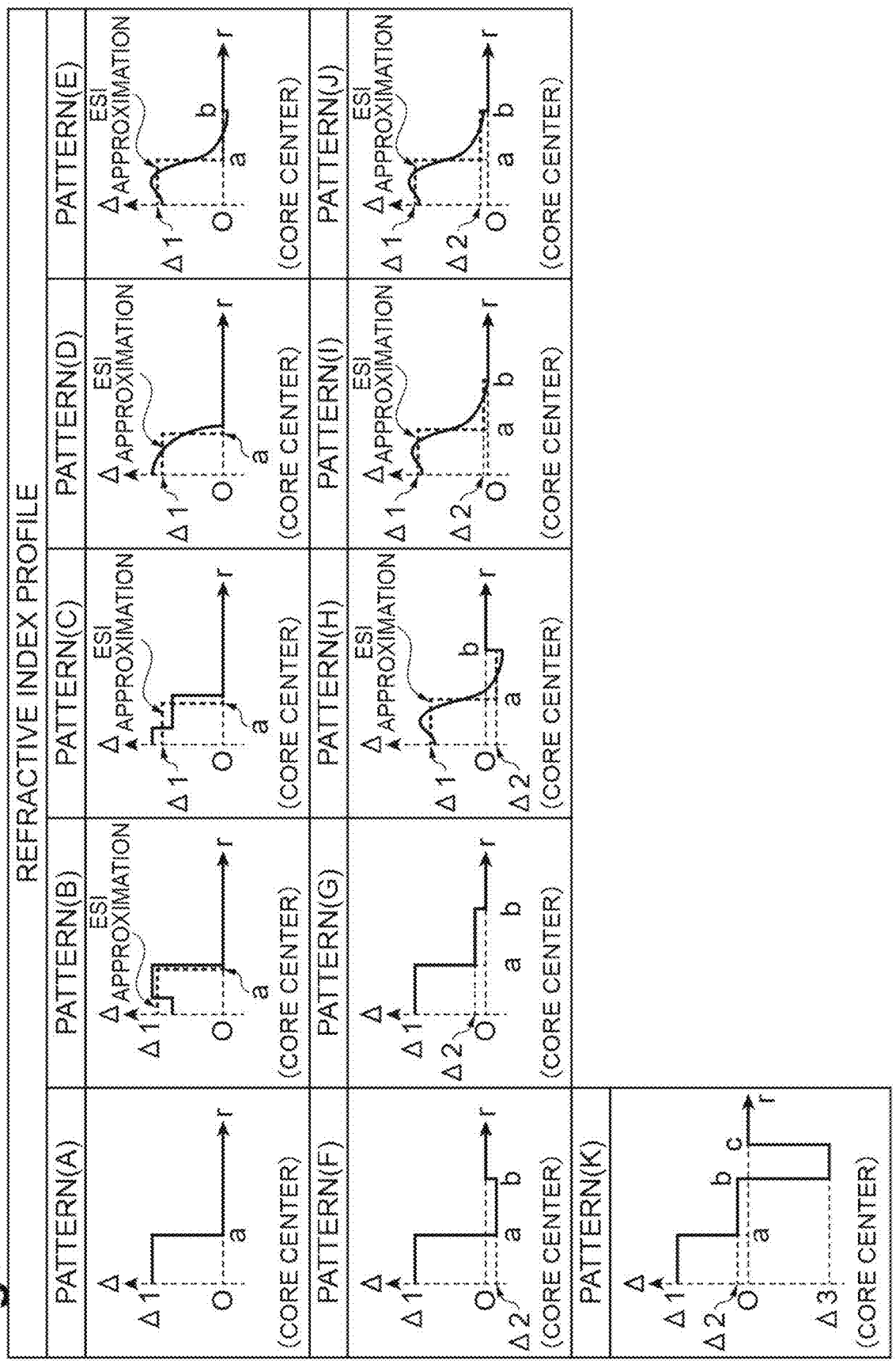
FIG. 4 is a diagram illustrating a refractive index profile around each core applicable to the MCF according to the present disclosure.

Next, a profile structure applicable to the MCF according to the present disclosure will be described. FIG. 4 is a diagram illustrating a refractive index profile around each core applicable to the MCF according to the present disclosure. Note that unless otherwise specified, a "relative refractive index difference Δ" means a relative refractive index difference with respect to the refractive index of the common cladding (and therefore, is not the relative refractive index difference with respect to the refractive index of pure silica glass).

Regarding the core structure in the MCF according to the present disclosure, an appropriate structure is selectable for the refractive index profile of the core and the optical characteristics associated with the profile in accordance with the use application. For example, refractive index profiles of a pattern (A) to a pattern (K) illustrated in FIG. 4 are applicable. Note that in FIG. 4, A represents a relative refractive index difference with the refractive index of the common cladding used as a reference, r represents a radius vector (radius) from each core center, and a local coordinate system in which each core center·Δ=0% is set to an origin O is illustrated. Structures may be same or different between the cores.

The pattern (A) illustrated in FIG. 4 is a step type refractive index profile, the pattern (B) is a ring type refractive index profile, the pattern (C) is a double step type refractive index profile, the pattern (D) is a graded type refractive index profile, and the pattern (E) is a fringe type refractive index profile. These are applicable to the core structure in the MCF according to the present disclosure. Further, the pattern (F) and the pattern (H) in which a Depressed type refractive index profile is provided around the core, the pattern (G), the pattern (I), and the pattern (J) in which a Raised type refractive index profile is provided around the core, and the pattern (E) in which a Matched type refractive index profile is provided around the core. These are also applicable to the core structure.

For the refractive index profiles other than the step type refractive index profile of the pattern (A), a core radius a and Δ (Δ1) of the core of a case of being approximated by the step type by using an ESI (Equivalent-Step-Index) approximation are obtainable (the above-described Non-Patent Document 6).

The above-described Non-Patent Document 6 is easily applicable in a case where the boundary between the core and the cladding is clear. However, it is difficult to apply the above Non-Patent Document 6 to a case where the boundary between the core and the cladding (the common cladding 120 or the optical cladding 121) is unclear as the fringe type refractive index profile of the pattern (E). For example, in a case where the method of the above-described Non-Patent Document 6 is applied without change with b in the pattern (E) regarded as the radius of the core, the ESI approximation does not work well. In such a case, it is preferable to apply the above-described Non-Patent Document 6 with r that takes ⅖ Δ of Δ at r, in which a slope (∂Δ/∂r) of the refractive index profile takes a negative value having a largest absolute value, regarded as the core radius a. In this situation, the refractive index r of the cladding (the common cladding 120 or the optical cladding 121) is a simple average of Δ in a range from a to b expressed in the following Formula (41):

$$\Delta 2 \approx \int_a^b \Delta dr. \quad (41)$$

Alternatively, by using the weighted average by r expressed in the following Formula (42):

$$\Delta 2 \approx \int_a^b \Delta r dr / \int_a^b r dr, \quad (42)$$

a and Δ1 (the maximum relative refractive index differences of the first core 110a and the second core 110b) are obtainable by the calculation based on the above-described Non-Patent Document 6. Δ2 (the relative refractive index difference of the optical cladding 121) is preferably −0.10% or more and 0.10% or less. This is because the manufacturability is significantly improved.

The trench layer 122 having a refractive index lower than those of the optical cladding 121 and the common cladding 120 may be provided around the optical cladding 121 (the pattern (K) in FIG. 4). However, in a case where the relative refractive index difference Δ3 of the trench layer 122 with the refractive index of the common cladding 120 used as a reference is −0.5% or less, the manufacturability is largely degraded. Therefore, Δ3≥−0.4% is preferable, Δ3≥−0.3% is more preferable, and Δ3≥−0.2% is further preferable. Note that from the viewpoint of the manufacturability, the absence of the trench layer is more preferable.

Regarding the material of the core and the cladding (the optical cladding 121 or the common cladding 120), glass containing silica glass as a main component is preferable, because a low transmission loss and high mechanical reliability are achievable. By doping Ge to the core, a refractive index difference generated between the core and the cladding is preferable. Alternatively, by doping F to the cladding, a refractive index difference generated between the core and the cladding is preferable. By doping a minute amount of F to the core and the optical cladding, a Depressed type profile is achievable with good manufacturability, and is preferable. Cl may be doped to the core or the cladding. This enables suppression of an OH group and suppression of an absorption loss caused by the OH group. A minute amount of P may be contained in the core or the cladding. This enables enhancement in manufacturability in a part of a glass synthesis process.

The MCF according to the present disclosure having the cross-sectional structure illustrated in FIG. 2 has the resin coating 130, and a diameter of the resin coating 130 preferably fall within a range of 235 μm or more and 265 μm or less. Accordingly, the MCF according to the present disclosure formed into a cable is enabled without making a significant change to existing cabling facilities or the like.

Note that in a typical general-purpose SMF, the nominal value $CD_{nominal}$ of a cladding diameter (a diameter of the glass fiber 200) is 125 μm, and the nominal value (a diameter nominal value) of the diameter of the resin coating 130 is 245 μm or more and about 250 μm. However, in the coated small-diameter SMF, the diameter nominal value of the resin coating is 180 μm, 190 μm, or 200 μm, in some cases. In this situation, the nominal value (the coating thickness nominal value) of the thickness of the resin coating 130 is respectively 27.5 μm, 32.5 μm, or 37.5 μm. As the thickness of the resin coating 130 is reduced, in a case where sand, dust, or the like damages the coating surface, the damage may reach the cladding made of glass and may weaken the strength of the optical fiber. Therefore, a sufficient coating thickness nominal value is demanded.

In the MCF according to the present disclosure, in order to achieve the diameter nominal value of the resin coating 130 of 250 μm and the coating thickness nominal value of 27.5 μm or more, the nominal value $CD_{nominal}$ of the cladding diameter is preferably 195 μm or less.

Further, in order to achieve the diameter nominal value of the resin coating 130 of 245 μm and the coating thickness nominal value of 27.5 μm or more, the $CD_{nominal}$ is further preferably 190 μm or less. In order to achieve the diameter nominal value of the resin coating 130 of 250 μm and the coating thickness nominal value of 32.5 μm or more, the $CD_{nominal}$ is preferably 185 μm or less. In order to achieve the diameter nominal value of the resin coating 130 of 245 μm and the coating thickness nominal value of 32.5 μm or more, the $CD_{nominal}$ is preferably 180 μm or less. In order to achieve the diameter nominal value of the resin coating 130 of 250 μm and the coating thickness nominal value of 37.5 μm or more, the $CD_{nominal}$ is preferably 175 μm or less. Furthermore, in order to achieve the diameter nominal value of the resin coating 130 of 245 μm and the coating thickness nominal value of 37.5 μm or more, the $CD_{nominal}$ is preferably 170 μm or less. In each case, the tolerance of the coating thickness preferably fall within a range of a value of the coating thickness nominal value−15 μm or more and a value of the coating thickness nominal value+15 μm or less, and more preferably all within a range of a value of the coating thickness nominal value−10 μm or more and a value of the coating thickness nominal value+10 μm or less.

The MCF according to the present disclosure preferably includes at least 12 cores. Accordingly, even in a case where the fusion is performed after the fibers of the MCF are subject to the axial rotational alignment one by one, the number of cores to be spliced per fusion can be made equal to that of ribbon fusion (12-fiber batch fusion) in a cable incorporating a large number of 12-fiber ribbons in splicing super multi-core cables.

The MCF according to the present disclosure may include 16 cores. In this case, even in a case where the fusion is performed after the fibers of the MCF are subject to the axial rotational alignment one by one, the number of cores to be spliced per fusion can be made equal to that of ribbon fusion (16-fiber batch fusion) in a cable incorporating a large number of 16 fiber ribbons in splicing super multi-core cables.

The MCF according to the present disclosure is demanded to have a core structure in which cores adjacent to any core do not satisfy an adjacent relationship between the cores. Accordingly, in bidirectional communication in which signals are transmitted in different propagation directions between the cores adjacent to a specific core, the counter propagation XT can be reduced. Here, as described above, the cores adjacent to a predetermined core (the specific core) are each a core having a large influence of the parallel propagation XT (the general XT of the case of propagating light in the identical direction) on the specific core. Specifically, the cores adjacent to a predetermined core (the specific core) are cores at positions each having the shortest center-to-center interval with respect to the specific core, and cores at positions each having the center-to-center interval similar to the shortest center-to-center interval (the difference is 2 μm or less).

Each core in the MCF according to the present disclosure preferably has an MFD at a wavelength of 1310 nm falling within a range of a value of an MFD reference value−0.4 μm or more and a value of the MFD reference value+0.4 μm or less with a value in a range of 8.6 μm or more and 9.2 μm or less used as the MFD reference value. In this case, among the general-purpose SMFs regulated in ITU-T G 652, in particular, as compared with a splice loss between the general-purpose SMFs of a type in which the nominal value of the MFD $MFD_{nominal}$ is small ($MFD_{nominal} \approx 8.6$ μm) and a bending loss is suppressed, a splice loss caused by an axis deviation between the MCFs according to the present disclosure (in a case where a predetermined axis deviation is given) can be made equal or less.

Each core in the MCF according to the present disclosure preferably has an MFD at a wavelength of 1310 nm falling within a range of 8.2 μm or more and 9.0 μm or less. Accordingly, among the general-purpose SMFs defined in ITU-T G 652, regarding the splice between a general-purpose SMF of a type in which the nominal value of the MFD is small and the bending loss is suppressed and the MCF according to the present disclosure, a splice loss caused by a core central axis deviation (an axis deviation) (in a case where a predetermined axis deviation is given) can be made equal.

Each core in the MCF according to the present disclosure preferably has an MFD at the wavelength of 1310 nm falling within a range of a value of an MFD reference value−0.4 μm or more and a value of the MFD reference value+0.4 μm or less with a value in a range of 8.2 μm or more and 8.6 μm or less used as the MFD reference value. Accordingly, among the general-purpose SMFs regulated in ITU-T G 652, in particular, for the general-purpose SMF of a type in which the $MFD_{nominal}$ is small ($MFD_{nominal} \approx 8.6$ μm) and a bending loss is suppressed, a splice loss caused by an axis deviation of the MCF according to the present disclosure (in a case where a predetermined axis deviation is given) can be suppressed to an increase of 10% or less. This means that in a case of the axis deviation, in which 0.15 dB is the splice loss of the general-purpose SMF of the type in which the bending loss is suppressed, the splice loss of the MCF according to the present disclosure is 0.15 dB or more and 0.165 dB or less. In a case of the axis deviation, in which 0.25 dB is the splice loss of the general-purpose SMF of the type in which the bending loss is suppressed, the splice loss of the MCF according to the present disclosure is 0.25 dB or more and 0.275 dB or less. In a case of the axis deviation, in which 0.50 dB is the splice loss of the general-purpose SMF of the type in which the bending loss is suppressed, the splice loss of the MCF according to the present disclosure is 0.50 dB or more and 0.55 dB or less. In a case of the axis deviation, in which 0.75 dB is the splice loss of the general-purpose SMF of the type in which the bending loss is suppressed, the splice loss of the MCF according to the present disclosure is 0.75 dB or more and 0.825 dB or less. In this situation, it is preferable that as the $MFD_{nominal}$ is smaller, the confinement of light to the core can be strengthened, and the leakage loss to the inter-core XT and the resin coating can be suppressed.

The MCF according to the present disclosure preferably has a zero-dispersion wavelength of 1300 nm or more and 1324 nm or less. Accordingly, a distortion of the signal waveform after transmission on an O-band can be suppressed to an extent same as that of the general-purpose SMF.

The MCF according to the present disclosure preferably has a zero-dispersion wavelength falling within a range of a value of a wavelength reference value−12 nm or more and a value of the wavelength reference value+12 nm or less with a value in a range of 1312 nm or more and 1340 nm or less used as the wavelength reference value. Accordingly, a distortion of the signal waveform after transmission on the O-band can be suppressed more than that of the general-purpose SMF (see the above-described Non-Patent Document 7).

In the MCF according to the present disclosure, on a used wavelength band, the total sum of the XT from the cores adjacent to any core is preferably −20 dB (=−20 dB/10 km) or less, even after the propagation for 10 km (corresponding to the fiber length of 10 km). The XT from the core other than the adjacent cores is sufficiently low and can be ignored. Therefore, a sufficient signal-to-noise ratio is achievable even in a case where a coherent wave is detected.

In the MCF according to the present disclosure, on the used wavelength band, the total sum of the XT from the adjacent cores to any core is preferably −40 dB (=−40 dB/10 km) or less, even after the propagation for 10 km (corresponding to the fiber length of 10 km). The XT from the core other than the adjacent cores is sufficiently low and can be ignored. Therefore, a sufficient signal-to-noise ratio is achievable even in a case where an intensity modulation direct wave is detected.

In the MCF according to the present disclosure, on the used wavelength band, the total sum (the parallel propagation XT) of the XT from the adjacent cores to any core is preferably −6.8 dB (=−6.8 dB/10 kin) or less, even after the propagation for 10 km (corresponding to the fiber length of 10 km). Accordingly, in the core arrangement in which 12 or more and 16 or less cores are arranged to constitute the square lattice, in a case of bidirectional communication in which the signal propagation directions between adjacent cores are opposite for all pairs of adjacent cores, the counter propagation XT (as illustrated in the example of FIG. 3, the total sum of XT that reaches through the adjacent core propagating the light in an opposite direction) with respect to any core, which can be a problem, can be suppressed to −20 dB (=−20 dB/10 kin) or less, even after the propagation for 10 km (corresponding to the fiber length of 10 km).

In the MCF according to the present disclosure, on the used wavelength band, the parallel propagation XT is preferably −16.8 dB (=−16.8 dB/10 km) or less, even after the propagation for 10 km (corresponding to the fiber length of 10 km). Accordingly, even after the counter propagation XT propagates for 10 km (corresponding to the fiber length of 10 km), the counter propagation XT can be suppressed to −40 dB (=−40 dB/10 km) or less.

In the following description, a description will be given with regard to studied results about an MCF including cores having the refractive index profiles of the pattern (E), the pattern (H), and the pattern (J) of FIG. 4, and having a of 3 μm or more and 5 μm or less, Δ1-Δ2 of 0.3% or more and 0.6% or less, Δ2 of −0.1% or more and 0.1% or less, and b/a of 2 or more and 5 or less.

The core structure having a predetermined zero-dispersion wavelength and the MFD can be designed by those skilled in the art by calculating an electric field distribution in a fundamental mode and a wavelength dependency of an effective refractive index using a finite element method or the like. For example, in a range of 3 μm≤a≤5 μm and 0.3%≤(Δ1−Δ2)≤0.6%, the relationship between a and (Δ1−Δ2), which is the zero-dispersion wavelength $\lambda_0$ [μm], is expressed in the following Formula (43):

$$a \approx 0.0667(\lambda_0 - 1343.1)(\Delta 1 - \Delta 2)^2 + \qquad (43)$$
$$0.0900(\lambda_0 - 1354.6)(\Delta 1 - \Delta 2) - 0.0517(\lambda_0 - 1411.2).$$

Therefore, in order for the zero-dispersion wavelength $\lambda_0$ [μm] to fall within a range of a value of $\lambda_{0nominal}$−12 nm or more and a value of $\lambda_{0nominal}$+12 nm or less, the relationship between a and (Δ1−Δ2) preferably satisfies both the following Formulas (44) and (45):

$$a \leq 0.0667(\lambda_{0nominal} - 12 - 1343.1)(\Delta 1 - \Delta 2)^2 + \qquad (44)$$
$$0.0900(\lambda_{0nominal} - 12 - 1354.6)(\Delta 1 - \Delta 2) -$$
$$0.0517(\lambda_{0nominal} - 12 - 1411.2); \text{ and}$$
$$a \geq 0.0667(\lambda_{0nominal} + 12 - 1343.1)(\Delta 1 - \Delta 2)^2 + \qquad (45)$$
$$0.0900(\lambda_{0nominal} + 12 - 1354.6)(\Delta 1 - \Delta 2) -$$
$$0.0517(\lambda_{0nominal} + 12 - 1411.2).$$

The relationship between a and (Δ1−Δ2) with respect to MFD [μm] at a wavelength of 1310 nm, in ranges of 3 μm≤a≤5 μm and 0.3%≤(Δ1−Δ2)≤0.6%, is expressed in the following Formula (46):

$$(\Delta 1 - \Delta 2) = \qquad (46)$$
$$(-0.0148MFD + 0.213)[a - 0.619MFD + 2.01]^2 - 0.0771MFD + 1.033.$$

Therefore, in order for the MFD [μm] to fall within a range of a value of $MFD_{nominal}$−0.4 μm or more and a value of $MFD_{nominal}$+0.4 μm or less, the relationship between a and (Δ1−Δ2) preferably satisfy both the following Formulas (47) and (48):

$$(\Delta 1 - \Delta 2) \leq [-0.0148(MFD_{nominal} + 0.4) + 0.213] \qquad (47)$$
$$[a - 0.619(MFD_{nominal} + 0.4) + 2.01]^2 -$$
$$0.0771(MFD_{nominal} + 0.4) + 1033;$$
$$\text{and}$$
$$(\Delta 1 - \Delta 2) \geq [-0.0148(MFD_{nominal} - 0.4) + 0.213] \qquad (48)$$
$$[a - 0.619(MFD_{nominal} - 0.4) + 2.01]^2 -$$
$$0.0771(MFD_{nominal} - 0.4) + 1.033.$$

It is enough to set b/a and Δ2 so that the $\lambda_{cc}$ is 1260 nm or less or 1360 nm or less and the zero-dispersion slope is 0.092 ps/(nm²·km). For this purpose, Δ2 preferably falls within a range of −0.1% or more and 0.0% or less, and b/a preferably falls within a range of 2 or more and 4 or less.

Figure 5:
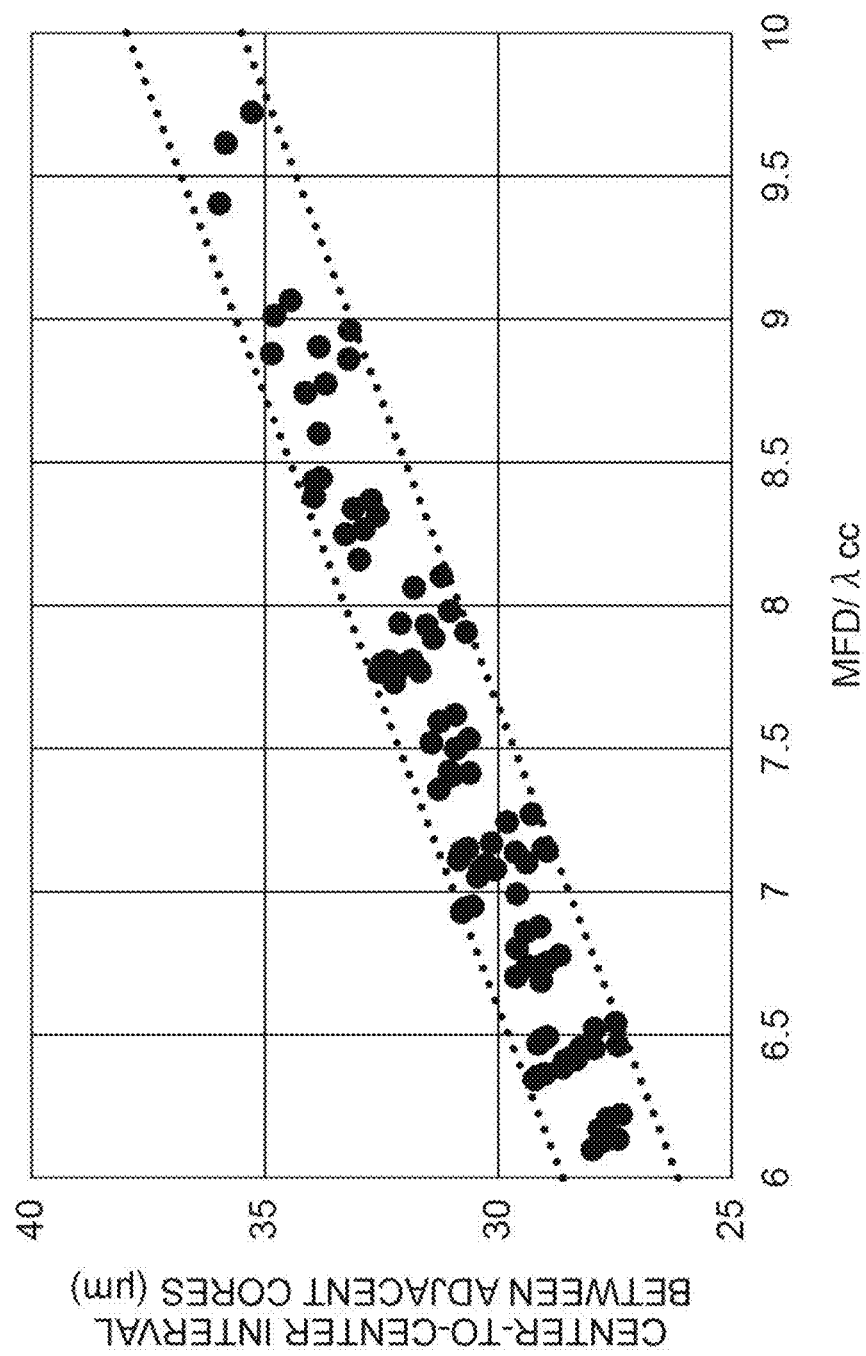
FIG. 5 is a graph illustrating a relationship between a center-to-center interval Λ between adjacent cores and MFD/$\lambda_{cc}$ in a case where a counter propagation XT at a wavelength of 1360 nm after propagation for 10 km (corresponding to a fiber length of 10 km) is −20 dB (=−20 dB/10 km), in an MCF in which 12 cores are arranged to constitute a square lattice (hereinafter, referred to as a "12-core MCF")

Next, a preferable center-to-center interval Λ between adjacent cores will be described. FIG. 5 is a graph illustrating a relationship between the center-to-center interval Λ between adjacent cores and MFD/$\lambda_{cc}$, in a case where the counter propagation XT at the wavelength of 1360 nm after the propagation for 10 km (corresponding to the fiber length of 10 km) is −20 dB (=−20 dB/10 km), in a 12-core MCF in which 12 cores are arranged to constitute the square lattice. Note that MFD/$\lambda_{cc}$ is a dimensionless amount, and MFD and $\lambda_{cc}$ are obtained in the same units. Almost the same results are also obtainable for a 16-core MCF in which 16 cores are arranged to constitute the square lattice. Therefore, FIG. 5 and the following discussion are also applicable to the 16-core MCF. Here, an average value R of the fiber bending radii is 0.14 m. As long as R is 0.14 m or less, a lower XT is achievable. Note that $\lambda_{cc}$ denotes a cable cutoff wavelength that has been measured with a configuration (a fiber that is not formed into a cable) of FIG. 12 of ITU-T G.4 650.1 (March 2018). In addition, in increasing the tolerance of the core structure, a low XT is achievable, even in a case where the effective refractive index difference varies between the adjacent cores, and the bending radius of the fiber is larger as described in Non-Patent Document 8 (in a case where R is 0.14 m or more and 0.3 m or less).

In order to set the counter propagation XT after the propagation for 10 km at a wavelength of 1360 nm (corresponding to the fiber length of 10 km) to −20 dB or less, the center-to-center interval Λ between the adjacent cores and MFD/$\lambda_{cc}$ satisfy at least one of the following Formula (49) and Formula (50) (a region above a lower dotted line illustrated in FIG. 5):

$$\Lambda \geq 2.34 MFD/\lambda_{cc} + 12.1; \text{ and} \quad (49)$$

$$MFD/\lambda_{cc} \leq 0.428\Lambda - 5.19. \quad (50)$$

Furthermore, the center-to-center interval Λ between the adjacent cores and MFD/$\lambda_{cc}$ preferably satisfy at least one of the following Formula (51) and Formula (52) (a region above an upper dotted line illustrated in FIG. 5):

$$\Lambda \geq 234 MFD/\lambda_{cc} + 146; \text{ and} \quad (51)$$

$$MFD/\lambda_{cc} \leq 0.428\Lambda - 6.25. \quad (52)$$

In order to allow the position of each core to vary from the design center, Λ preferably takes a margin of 1 μm from the range indicated in the above Formulas (49) to (52). Therefore, by setting the nominal value of Λ to $\Lambda_{nominal}$, at least the following Formula (53):

$$\Lambda_{nominal} \geq 2.34 MFD/\lambda_{cc} + 12.1 + 10 \quad (53)$$

is satisfied:

Furthermore, with respect to $\Lambda_{nominal}$ that satisfies the following Formula (54), Λ preferably satisfies the following Formula (55):

$$\Lambda_{nominal} \geq 2.34 MFD/\lambda_{cc} + 14.6 + 1.0; \text{ and} \quad (54)$$

$$\Lambda_{nominal} - 0.9 \leq \Lambda \leq \Lambda_{nominal} + 0.9. \quad (55)$$

In this situation, the positions of the respective cores can be independently considered as approximations of a case where a Gaussian distribution of 3σ=0.9 μm from the design center varies as a probability distribution, and the probability that Λ does not satisfy at least one of Formula (49) and Formula (51) is suppressed to 1% or less. Furthermore, Λ preferably satisfies the following Formula (56):

$$\Lambda_{nominal} - 0.7 \leq \Lambda \leq \Lambda_{nominal} + 0.7. \quad (56)$$

In this situation, the positions of the respective cores can be independently considered as approximations of a case where a Gaussian distribution of 3σ=0.7 μm from the design center varies as a probability distribution, and the probability that Λ does not satisfy at least one of Formula (49) and Formula (51) is suppressed to 0.1% or less. Furthermore, Λ preferably satisfies the following Formula (57):

$$\Lambda_{nominal} - 0.5 \leq \Lambda \leq \Lambda_{nominal} + 0.5. \quad (57)$$

In this situation, the positions of the respective cores can be independently considered as approximations of a case where a Gaussian distribution of 3σ=0.5 μm from the design center varies as a probability distribution, and the probability that Λ does not satisfy at least one of Formula (49) and Formula (51) is suppressed to 0.001% or less.

Regarding both the 12-core MCF and the 16-core MCF, similar studies are given with regard to the relationship between the center-to-center interval Λ between adjacent cores and MFD/$\lambda_{cc}$, in a case where the parallel propagation XT after the propagation for 10 km at the wavelength of 1360 nm (corresponding to the fiber length of 10 km) is −20 dB. Then, the same results are obtained in both the case of the 12-core MCF and the case of the 16-core MCF. That is, in order to set the parallel propagation XT after the propagation for 10 km (corresponding to the fiber length of 10 km) at the wavelength of 1360 nm to −20 dB or less, the center-to-center interval Λ between adjacent cores and MFD/$\lambda_{cc}$ satisfy at least one of the following Formula (58) and Formula (59):

$$\Lambda \geq 2.73 MFD/\lambda_{cc} + 12.7; \text{ and} \quad (58)$$

$$MFD/\lambda_{cc} \leq 0.367\Lambda - 4.66. \quad (59)$$

Furthermore, the center-to-center interval Λ between the adjacent cores and MFD/$\lambda_{cc}$ preferably satisfies at least one of the following Formula (60) and Formula (61):

$$\Lambda \geq 2.73 MFD/\lambda_{cc} + 15.1; \text{ and} \quad (60)$$

$$MFD/\lambda_{cc} \leq 0.367\Lambda - 5.54. \quad (61)$$

In order to allow the position of each core to vary from the design center, Λ preferably takes a margin of 1 μm from the range of the above Formulas (58) to (61). Therefore, by setting the nominal value of $\Lambda$ to $\Lambda_{nominal}$, at least the following Formula (62):

$$\Lambda_{nominal} \geq 2.73 MFD/\lambda_{cc} + 12.7 + 1.0 \qquad (62)$$

is satisfied.

Furthermore, with respect to $\Lambda_{nominal}$ that satisfies the following Formula (63), $\Lambda$ preferably satisfies the following Formula (64):

$$\Lambda_{nominal} \geq 2.73 MFD/\lambda_{cc} + 15.1 + 1.0; \text{ and} \qquad (63)$$

$$\Lambda_{nominal} - 0.9 \leq \Lambda \leq \Lambda_{nominal} + 0.9. \qquad (64)$$

In this situation, the positions of the respective cores can be independently considered as approximations of a case where a Gaussian distribution of $3\sigma=0.9$ μm from the design center varies as a probability distribution, and the probability that $\Lambda$ does not satisfy at least one of Formula (58) and Formula (60) is suppressed to 1% or less. Furthermore, $\Lambda$ preferably satisfies the following Formula (65):

$$\Lambda_{nominal} - 0.7 \leq \Lambda \leq \Lambda_{nominal} + 0.7. \qquad (65)$$

In this situation, the positions of the respective cores can be independently considered as approximations of a case where a Gaussian distribution of $3\sigma=0.7$ μm from the design center varies as a probability distribution, and the probability that $\Lambda$ does not satisfy at least one of Formula (58) and Formula (60) is suppressed to 0.1% or less. Furthermore, $\Lambda$ preferably satisfies the following Formula (66):

$$\Lambda_{nominal} - 0.5 \leq \Lambda \leq \Lambda_{nominal} + 0.5. \qquad (66)$$

In this situation, the positions of the respective cores can be independently considered as approximations of a case where a Gaussian distribution of $3\sigma=0.5$ μm from the design center varies as a probability distribution, and the probability that $\Lambda$ does not satisfy at least one of Formula (58) and Formula (60) is suppressed to 0.001% or less.

Figure 6:
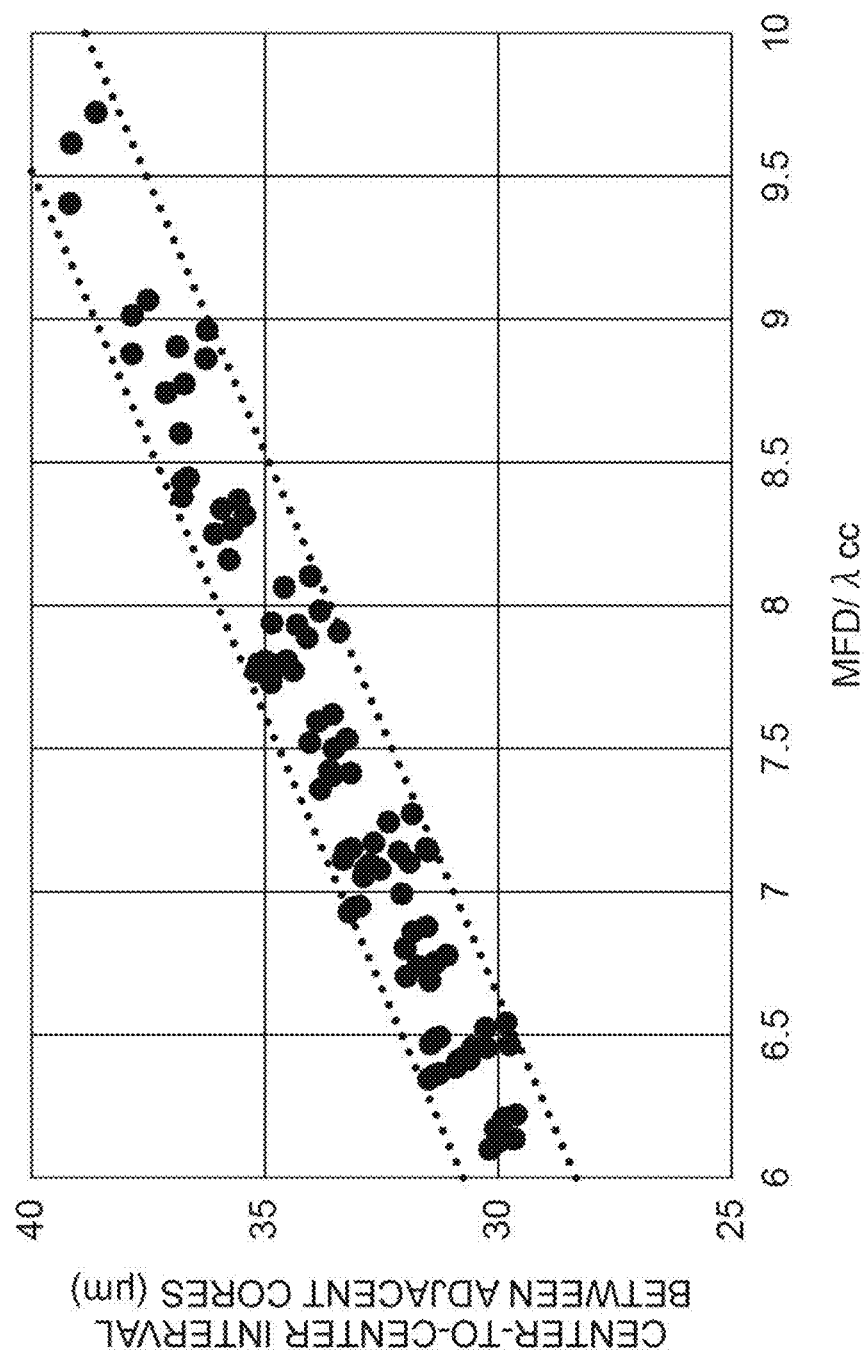
FIG. 6 is a graph illustrating a relationship between the center-to-center interval Λ between the adjacent cores and MFD/$\lambda_{cc}$ in a case where the counter propagation XT at the wavelength of 1360 nm after the propagation for 10 km (corresponding to the fiber length of 10 km) is −40 dB (=−40 dB/10 km), in the 12-core MCF.

FIG. 6 is a graph illustrating a relationship between the center-to-center interval $\Lambda$ between adjacent cores and MFD/$\lambda_{cc}$ in a case where the counter propagation XT at the wavelength of 1360 nm after propagation for 10 km (corresponding to the fiber length of 10 km) is −40 dB (=−40 dB/10 km), in the 12-core MCF in which 12 cores are arranged to constitute the square lattice. Note that since almost the same result is obtainable in the 16-core MCF, FIG. 6 and the following discussion are also applicable to the 16-core MCF.

In order to set the counter propagation XT after the propagation for 10 km at the wavelength of 1360 nm (corresponding to the fiber length of 10 km) to −40 dB or less, the center-to-center interval $\Lambda$ between the adjacent cores and MFD/$\lambda_{cc}$ satisfy at least one of the following Formula (67) and Formula (68) (a region above a lower dotted line illustrated in FIG. 6):

$$\Lambda \geq 2.63 MFD/\lambda_{cc} + 12.5; \text{ and} \qquad (67)$$

$$MFD/\lambda_{cc} \leq 0.380\Lambda - 4.77. \qquad (68)$$

Furthermore, the center-to-center interval $\Lambda$ between the adjacent cores and MFD/$\lambda_{cc}$ preferably satisfy at least one of the following Formula (69) and Formula (70) (a region above an upper dotted line illustrated in FIG. 6):

$$\Lambda \geq 2.63 MFD/\lambda_{cc} + 15.0; \text{ and} \qquad (69)$$

$$MFD/\lambda_{cc} \leq 0.380\Lambda - 5.69. \qquad (70)$$

In order to allow the position of each core to vary from the design center, $\Lambda$ preferably takes a margin of at least 1 μm from the range of the above Formulas (67) to (70). Therefore, by setting the nominal value of $\Lambda$ to $\Lambda_{nominal}$, at least the following Formula (71):

$$\Lambda_{nominal} \geq 2.63 MFD/\lambda_{cc} + 12.5 + 1.0 \qquad (71)$$

is satisfied.

Furthermore, with respect to $\Lambda_{nominal}$ that satisfies the following Formula (72), $\Lambda$ preferably satisfies the following Formula (73):

$$\Lambda_{nominal} \geq 2.63 MFD/\lambda_{cc} + 15.0 + 1.0; \text{ and} \qquad (72)$$

$$\Lambda_{nominal} - 0.9 \leq \Lambda \leq \Lambda_{nominal} + 0.9. \qquad (73)$$

In this situation, the positions of the respective cores can be independently considered as approximations of a case where a Gaussian distribution of $3\sigma=0.9$ μm from the design center varies as a probability distribution, and the probability that $\Lambda$ does not satisfy at least one of Formula (67) and Formula (69) is suppressed to 1% or less. Furthermore, $\Lambda$ preferably satisfies the following Formula (74):

$$\Lambda_{nominal} - 0.7 \leq \Lambda \leq \Lambda_{nominal} + 0.7. \qquad (74)$$

In this situation, the positions of the respective cores can be independently considered as approximations of a case where a Gaussian distribution of $3\sigma=0.7$ μm from the design center varies as a probability distribution, and the probability that $\Lambda$ does not satisfy at least one of Formula (67) and Formula (69) is suppressed to 0.1% or less. Furthermore, $\Lambda$ preferably satisfies the following Formula (75):

$$\Lambda_{nominal} - 0.5 \leq \Lambda \leq \Lambda_{nominal} + 0.5. \qquad (75)$$

In this situation, the positions of the respective cores can be independently considered as approximations of a case where a Gaussian distribution of $3\sigma=0.5$ μm from the design center varies as a probability distribution, and the probability that $\Lambda$ does not satisfy at least one of Formula (67) and Formula (69) is suppressed to 0.001% or less.

In the 12-core MCF and the 16-core MCF, similar studies are given with regard to the relationship between the center-to-center interval Λ between adjacent cores and MFD/$\lambda_{cc}$, in a case where the parallel propagation XT after the propagation for 10 km at the wavelength of 1360 nm (corresponding to the fiber length of 10 km) is −40 dB. Then, both the 12-core MCF and the 16-core MCF have exactly the same results. In order to set the parallel propagation XT after the propagation for 10 km at the wavelength of 1360 nm (corresponding to the fiber length of 10 km) to −40 dB or less, the center-to-center interval Λ between the adjacent cores and MFD/$\lambda_{cc}$ satisfy at least one of the following Formula (76) and Formula (77) (a region above a lower dotted line illustrated in FIG. 6):

$$\Lambda \geq 3.31 MFD/\lambda_{cc} + 12.6; \text{ and} \tag{76}$$

$$MFD/\lambda_{cc} \leq 0.377\Lambda - 4.75. \tag{77}$$

Furthermore, the center-to-center interval Λ between the adjacent cores and MFD/$\lambda_{cc}$ preferably satisfy at least one of the following Formula (78) and Formula (79) (a region above an upper dotted line illustrated in FIG. 6):

$$\Lambda \geq 3.31 MFD/\lambda_{cc} + 15.0; \text{ and} \tag{78}$$

$$MFD/\lambda_{cc} \leq 0.377\Lambda - 5.66. \tag{79}$$

In order to allow the position of each core to vary from the design center, Λ preferably takes a margin of at least 1 μm from the range of the above Formulas (76) to (79). Therefore, by setting Λ to the nominal value of Λ, $\Lambda_{nominal}$, at least the following Formula (80):

$$\Lambda_{nominal} \geq 3.31 MFD/\lambda_{cc} + 12.6 + 1.0 \tag{80}$$

is satisfied.

Furthermore, with respect to $\Lambda_{nominal}$ that satisfies the following Formula (81), Λ preferably satisfies the following Formula (82):

$$\Lambda_{nominal} \geq 3.31 MFD/\lambda_{cc} + 15.0 + 1.0; \text{ and} \tag{81}$$

$$\Lambda_{nominal} - 0.9 \leq \Lambda \leq \Lambda_{nominal} + 0.9. \tag{82}$$

In this situation, the positions of the respective cores can be independently considered as approximations of a case where a Gaussian distribution of 3σ=0.9 μm from the design center varies as a probability distribution, and the probability that Λ does not satisfy at least one of Formula (76) and Formula (78) is suppressed to 1% or less. Furthermore, Λ preferably satisfies the following Formula (83):

$$\Lambda_{nominal} - 0.7 \leq \Lambda \leq \Lambda_{nominal} + 0.7. \tag{83}$$

In this situation, the positions of the respective cores can be independently considered as approximations of a case where a Gaussian distribution of 3σ=0.7 μm from the design center varies as a probability distribution, and the probability that Λ does not satisfy at least one of Formula (76) and Formula (78) is suppressed to 0.1% or less. Furthermore, Λ preferably satisfies the following Formula (84):

$$\Lambda_{nominal} - 0.5 \leq \Lambda \leq \Lambda_{nominal} + 0.5. \tag{84}$$

In this situation, the positions of the respective cores can be independently considered as approximations of a case where a Gaussian distribution of 3σ=0.5 μm from the design center varies as a probability distribution, and the probability that Λ does not satisfy at least one of Formula (76) and Formula (78) is suppressed to 0.001% or less.

Figure 7:
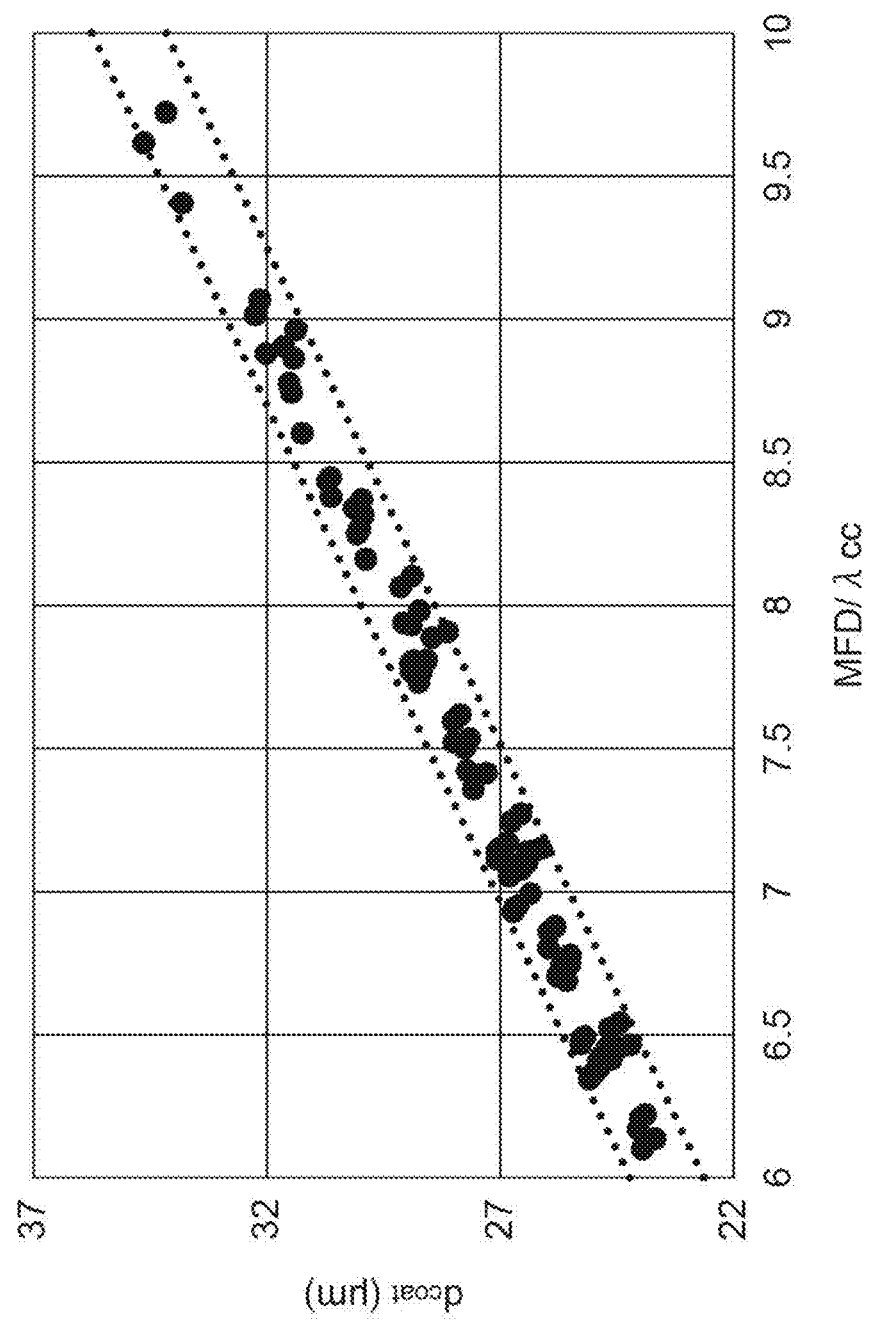
FIG. 7 is a graph illustrating a relationship between $d_{coat}$ and MFD/$\lambda_{cc}$ in a case where a leakage loss to the coating at the wavelength of 1360 nm is 0.01 dB/km, in the 12-core MCF.

Next, a preferable $d_{coat}$ (the shortest distance from the resin coating and a cladding interface to the core center) will be described. FIG. 7 is a graph illustrating a relationship between $d_{coat}$ and MFD/$\lambda_{cc}$ in a case where the leakage loss to the coating at the wavelength of 1360 nm is 0.01 dB/km, in the MCF in which 12 cores are arranged to constitute the square lattice.

In order to set the leakage loss to the resin coating to 0.01 dB/km at the wavelength of 1360 nm, $d_{coat}$ and MFD/$\lambda_{cc}$ satisfy at least one of the following Formula (85) and Formula (86) (a region above a lower dotted line illustrated in FIG. 7):

$$d_{coat} \geq 2.88 MFD/\lambda_{cc} + 5.36; \text{ and} \tag{85}$$

$$MFD/\lambda_{cc} \leq 0.347 d_{coat} - 1.86. \tag{86}$$

Furthermore, $d_{coat}$ and MFD/$\lambda_{cc}$ preferably satisfy at least one of the following Formula (87) and Formula (88) (a region above an upper dotted line illustrated in FIG. 7):

$$d_{coat} \geq 2.88 MFD/\lambda_{cc} + 6.95; \text{ and} \tag{87}$$

$$MFD/\lambda_{cc} \leq 0.347 d_{coat} - 2.41. \tag{88}$$

The $d_{coat}$ of the outermost peripheral core (that is, the minimum value of $d_{coat}$) is generally referred to as an outer cladding thickness (OCT). However, $d_{coat}$ according to the present disclosure is defined as a value that can be regulated for each core.

In order to allow the position of each core to vary from the design center and to vary the cladding diameter from the design center, $d_{coat}$ preferably takes a margin of at least 1 μm from the range of the above Formulas (85) to (88). Thus, regarding $d_{coat}$, by setting $d_{coat}$ to a nominal value $d_{coat,nominal}$, at least the following Formula (89):

$$d_{coat,nominal} \geq 2.88 MFD/\lambda_{cc} + 5.36 + 1.0 \tag{89}$$

is satisfied.

Furthermore, the nominal value $CD_{nominal}$ of the cladding diameter is preferably set to satisfy the following Formula (90):

$$d_{coat,nominal} \geq 2.88 MFD/\lambda_{cc} + 6.95 + 1.0. \tag{90}$$

In this situation, both the following Formula (91) and Formula (92):

$$\Lambda_{nominal} - 0.9 \leq \Lambda \leq \Lambda_{nominal} + 0.9; \text{ and} \quad (91)$$

$$CD_{nominal} - 0.9 \leq CD \leq CD_{nominal} + 0.9 \quad (92)$$

are preferably satisfied.

The probability that $d_{coat}$ does not satisfy at least one of Formula (85) and Formula (87) is suppressed to 1% or less. Further, both the following Formula (93) and Formula (94):

$$\Lambda_{nominal} - 0.7 \leq \Lambda \leq \Lambda_{nominal} + 0.7; \text{ and} \quad (93)$$

$$CD_{nominal} - 0.7 \leq CD \leq CD_{nominal} + 0.7 \quad (94)$$

are preferably satisfied.

In this situation, the probability that $d_{coat}$ does not satisfy at least one of Formula (85) and Formula (87) is suppressed to 0.1% or less. Further, both the following Formula (95) and Formula (96):

$$\Lambda_{nominal} - 0.5 \leq \Lambda \leq \Lambda_{nominal} + 0.5; \text{ and} \quad (95)$$

$$CD_{nominal} - 0.5 \leq CD \leq CD_{nominal} + 0.5 \quad (96)$$

are preferably satisfied.

In this situation, the probability that $d_{coat}$ does not satisfy at least one of Formula (85) and Formula (87) is suppressed to 0.001% or less.

Figure 8:
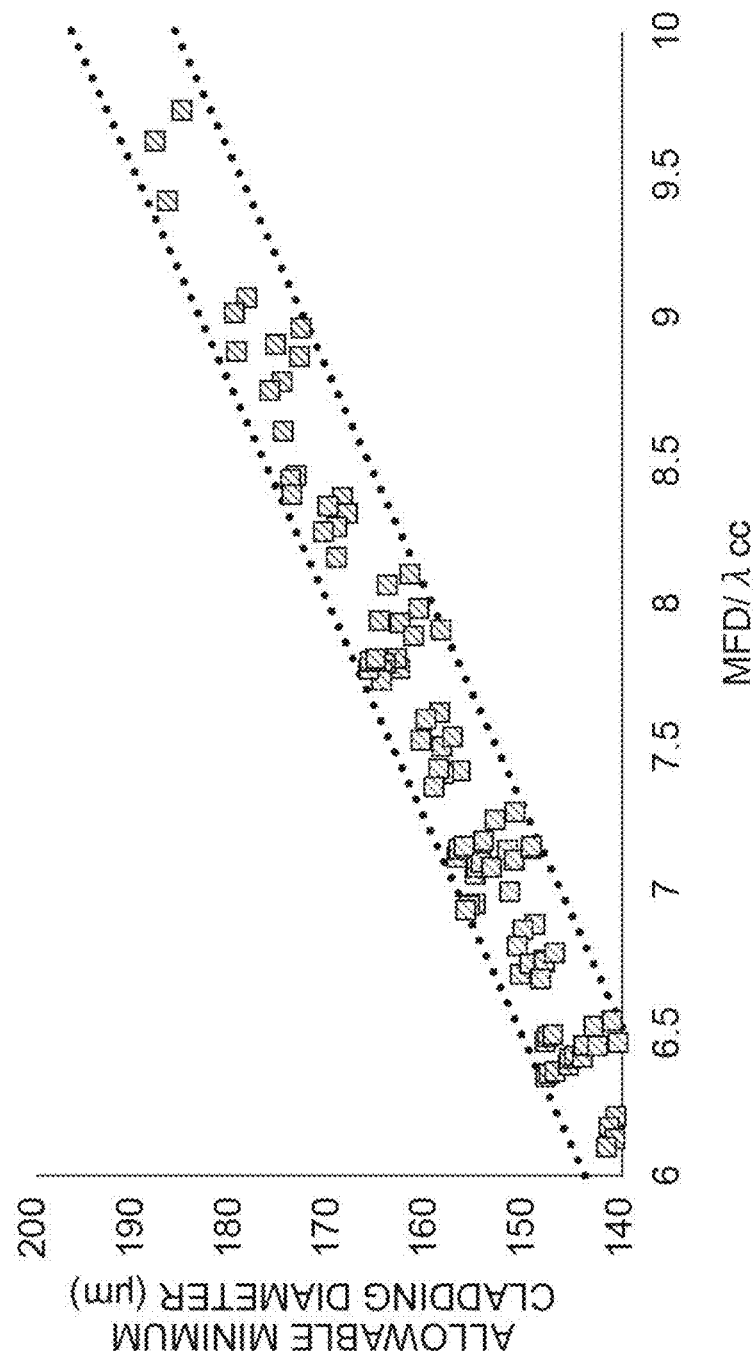
FIG. 8 is a graph illustrating a relationship between a CD and MFD/$\lambda_{cc}$ of a case where a margin of 1 μm is added to $d_{coat}$ when the leakage loss to the coating at the wavelength of 1360 nm is 0.01 dB/km, and the margin of 1 μm is added to Λ when the counter propagation XT at the wavelength of 1360 nm after the propagation for 10 km (corresponding to the fiber length of 10 km) is −20 dB (=−20 dB/10 km), in the 12-core MCF.

Next, a minimum allowable $CD_{nominal}$ will be described. FIG. 8 is a graph illustrating a relationship between CD and MFD/$\lambda_{cc}$ of a case where a margin of 1 μm is added to $d_{coat}$ when the leakage loss to the coating at the wavelength of 1360 nm is 0.01 dB/km, and a margin of 1 μm is added to $\Lambda$ when the counter propagation XT at the wavelength of 1360 nm after the propagation for 10 km (corresponding to the fiber length of 10 km) is −20 dB (=−20 dB/10 km), in the 12-core MCF in which 12 cores are arranged to constitute the square lattice.

In consideration of tolerances in dimensions of the core position and the cladding diameter, in order to set the leakage loss to the resin coating to 0.01 dB/km or less at the wavelength of 1360 nm and to set the counter propagation XT to −20 dB or less after the propagation for 10 km (corresponding to the fiber length of 10 km), the relationship between $CD_{nominal}$ and MFD/$\lambda_{cc}$ satisfies at least one of the following Formula (97) and Formula (98) (a region above a lower dotted line illustrated in FIG. 8):

$$CD_{nominal} \geq 13.15 MFD/\lambda_{cc} + 54.25; \text{ and} \quad (97)$$

$$MFD/\lambda_{cc} \leq 0.07606 CD_{nominal} - 4.126. \quad (98)$$

Furthermore, the relationship between $CD_{nominal}$ and MFD/$\lambda_{cc}$ preferably satisfies at least one of the following Formula (99) and Formula (100) (a region above an upper dotted line illustrated in FIG. 8):

$$CD_{nominal} \geq 13.15 MFD/\lambda_{cc} + 64.88; \text{ and} \quad (99)$$

$$MFD/\lambda_{cc} \leq 0.07606 CD_{nominal} - 4.935. \quad (100)$$

Note that in FIG. 8, in a case where y represents the vertical axis and x represents the horizontal axis, the upper dotted line is given by y=13.15x+64.88 (x=7.606×10$^{-2}$y−4.935), and the lower dotted line is given by y=13.15x+54.25 (x=7.606×10$^{-2}$y−4.126).

Figure 9:
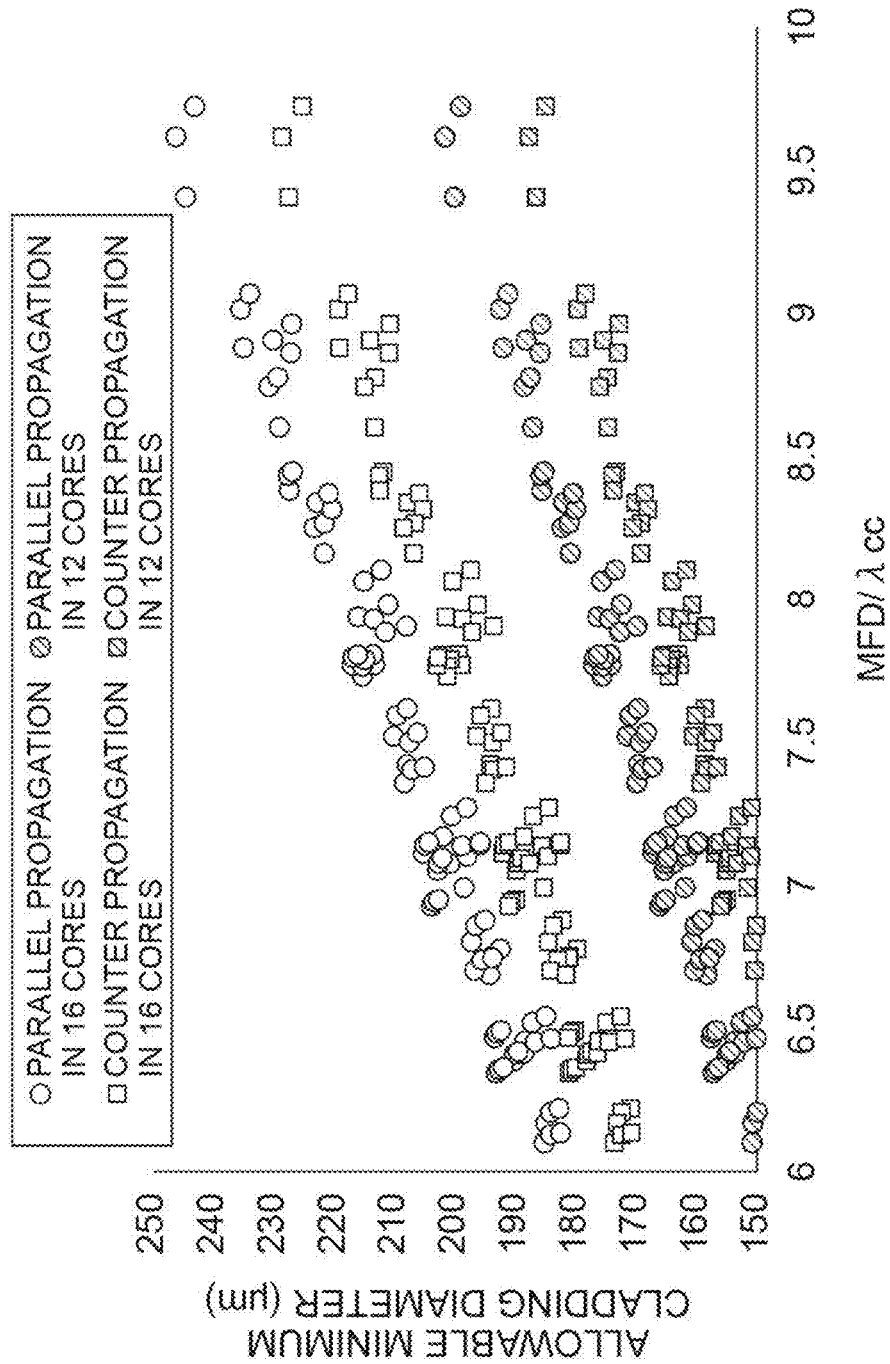
FIG. 9 is a graph illustrating a relationship between the CD and MFD/$\lambda_{cc}$ of a case where a margin of 1 μm is added to $d_{coat}$ and a margin of 1 μm is added to Λ when the leakage loss to the coating at the wavelength of 1360 nm is 0.01 dB/km, under a condition that the counter propagation XT at the wavelength 1360 nm after the propagation for 10 km (corresponding to the fiber length of 10 km) is −20 dB (=−20 dB/10 km) or a parallel propagation XT after the propagation for 10 km (corresponding to the fiber length of 10 km) (an XT at general propagation in an identical direction) is −20 dB (=−20 dB/10 km), in a case of the 12-core MCF and in an MCF in which 16 cores are arranged to constitute a square lattice (hereinafter, referred to as a "16-core MCF")

FIG. 9 is a graph illustrating a relationship between CD and MFD/$\lambda_{cc}$ of a case where a margin of 1 μm is added to $d_{coat}$ and a margin of 1 μm is added to $\Lambda$ when the leakage loss to the coating at the wavelength of 1360 nm is 0.01 dB/km, under the condition that the counter propagation XT at the wavelength 1360 nm after the propagation for 10 km (corresponding to the fiber length of 10 km) is −20 dB (=−20 dB/10 km) and the parallel propagation XT after the propagation for 10 km (corresponding to the fiber length of 10 km) (XT at the general propagation in the identical direction) is −20 dB (=−20 dB/10 km), in the 12-core MCF in which 12 cores are arranged to constitute the square lattice and in the 16-core MCF in which 16 cores are arranged to constitute the square lattice. Note that in FIG. 9, a symbol "○" represents a relationship in the 16-core MCF for the parallel propagation between the adjacent cores, a symbol "□" represents a relationship in the 16-core MCF for the counter propagation between the adjacent cores, a symbol "●" (indicated by oblique lines in FIG. 9)" represents a relationship in the 12-core MCF for the parallel propagation between the adjacent cores, and a symbol "■ (indicated by oblique lines in FIG. 9)" represents a relationship in the 12-core MCF for the counter propagation between the adjacent cores.

As can be understood from FIG. 9, it is preferable to use the MCF according to the present disclosure for not the parallel propagation but for the counter propagation, because the CD can be reduced by a little more than 10 μm. It is preferable to use the 12-core MCF, because the CD can be reduced by 35 μm as compared with the 16-core MCF.

Note that although no broken line is displayed in FIG. 9, in a similar manner to the case of FIG. 8, in the 16-core MCF, in consideration of the tolerances in the dimensions of the core position and the cladding diameter, in order to set the leakage loss to the resin coating at the wavelength of 1360 nm to 0.01 dB/km or less and to set the parallel propagation XT to −20 dB or less after the propagation for 10 km (corresponding to the fiber length of 10 km), the relationship between the $CD_{nominal}$ and MFD/$\lambda_{cc}$ satisfies at least one of the following Formula (101) and Formula (102):

$$CD_{nominal} \geq 17.33 MFD/\lambda_{cc} + 70.83; \text{ and} \quad (101)$$

$$MFD/\lambda_{cc} \leq 0.05772 CD_{nominal} - 4.088. \quad (102)$$

Furthermore, the relationship between $CD_{nominal}$ and MFD/$\lambda_{cc}$ preferably satisfies at least one of the following Formula (103) and Formula (104):

$$CD_{nominal} \geq 17.33 MFD/\lambda_{cc} + 83.86; \text{ and} \quad (103)$$

$$MFD/\lambda_{cc} \leq 0.05772 CD_{nominal} - 4.840. \quad (104)$$

In order to set the counter propagation XT to −20 dB or less after the propagation for 10 km (corresponding to the fiber length of 10 km), the relationship between $CD_{nominal}$ and MFD/$\lambda_{cc}$ satisfies at least one of the following Formula (105) and Formula (106):

$$CD_{nominal} \geq 15.77 MFD/\lambda_{cc} + 68.58; \text{ and} \quad (105)$$

$$MFD/\lambda_{cc} \leq 0.06342 CD_{nominal} - 4.349. \quad (106)$$

Furthermore, the relationship between $CD_{nominal}$ and $MFD/\lambda_{cc}$ preferably satisfies at least one of the following Formula (107) and Formula (108):

$$CD_{nominal} \geq 15.77 MFD/\lambda_{cc} + 81.85; \text{ and} \qquad (107)$$

$$MFD/\lambda_{cc} \leq 0.06342 CD_{nominal} - 5.191. \qquad (108)$$

In the 12-core MCF, in order to set the parallel propagation XT to −20 dB or less after the propagation for 10 km (corresponding to the fiber length of 10 km), the relationship between $CD_{nominal}$ and $MFD/\lambda_{cc}$ satisfies at least one of the following Formula (109) and Formula (110):

$$CD_{nominal} \geq 14.38 MFD/\lambda_{cc} + 56.03; \text{ and} \qquad (109)$$

$$MFD/\lambda_{cc} \leq 0.06954 CD_{nominal} - 3.896. \qquad (110)$$

Furthermore, the relationship between $CD_{nominal}$ and $MFD/\lambda_{cc}$ preferably satisfies at least one of the following Formula (111) and Formula (112):

$$CD_{nominal} \geq 14.38 MFD/\lambda_{cc} + 66.47; \text{ and} \qquad (111)$$

$$MFD/\lambda_{cc} \leq 0.06954 CD_{nominal} - 4.622. \qquad (112)$$

In a case where the $CD_{nominal}$ is 195 μm, 190 μm, 185 μm, 180 μm, 175 μm, or 170 μm, in the 16-core MCF, in consideration of the tolerances in the dimensions of the core position and the cladding diameter, in order to set the leakage loss to the resin coating at the wavelength of 1360 nm to 0.01 dB/km or less and to set the parallel propagation XT to −20 dB or less after the propagation for 10 km (corresponding to the fiber length of 10 km), $MFD/\lambda_{cc}$ is preferably 7.17 or less, 6.88 or less, 6.59 or less, 6.30 or less, 6.01 or less, or 5.72 or less in the order of numerical values of the $CD_{nominal}$ as listed above, and is preferably 6.41 or less, 6.13 or less, 5.84 or less, 5.55 or less, 5.26 or less, or 4.97 or less in the order of numerical values of the $CD_{nominal}$ as listed above.

In the case where the $CD_{nominal}$ is 195 μm, 190 μm, 185 μm, 180 μm, 175 μm, or 170 μm, in the 16-core MCF, in consideration of the tolerances in the dimensions of the core position and the cladding diameter, in order to set the leakage loss to the resin coating at the wavelength of 1360 nm to 0.01 dB/km or less and to set the counter propagation XT to −20 dB or less after the propagation for 10 km (corresponding to the fiber length of 10 km), $MFD/\lambda_{cc}$ is preferably 8.02 or less, 7.70 or less, 7.38 or less, 7.07 or less, 6.75 or less, or 6.43 or less in the order of the $CD_{nominal}$ numerical values as listed above, and is preferably 7.18 or less, 6.86 or less, 6.54 or less, 6.22 or less, 5.91 or less, or 5.59 or less in the order of the $CD_{nominal}$ numerical values as listed above.

In a case where the $CD_{nominal}$ is 195 μm, 190 μm, 185 μm, 180 μm, 175 μm, or 170 μm, in the 12-core MCF, in consideration of the tolerances in the dimensions of the core position and the cladding diameter, in order to set the leakage loss to the resin coating at the wavelength of 1360 nm to 0.01 dB/km or less and to set the counter propagation XT to −20 dB or less after the propagation for 10 km (corresponding to the fiber length of 10 km), $MFD/\lambda_{cc}$ is preferably 9.66 or less, 9.32 or less, 8.97 or less, 8.62 or less, 8.27 or less, or 7.93 or less in the order of the $CD_{nominal}$ numerical values as listed above, and is preferably 8.94 or less, 8.59 or less, 8.24 or less, 7.89 or less, 7.55 or less, or 7.20 or less in the order of the $CD_{nominal}$ numerical values as listed above.

In the case where the $CD_{nominal}$ is 195 μm, 190 μm, 185 μm, 180 μm, 175 μm, or 170 μm, in the 12-core MCF, in consideration of the tolerances in the dimensions of the core position and the cladding diameter, in order to set the leakage loss to the resin coating at the wavelength of 1360 nm to 0.01 dB/km or less and to set the counter propagation XT to −20 dB or less after the propagation for 10 km (corresponding to the fiber length of 10 km), $MFD/\lambda_{cc}$ is preferably 10.71 or less, 10.33 or less, 9.94 or less, 9.56 or less, 9.18 or less, or 8.80 or less in the order of the $CD_{nominal}$ numerical values as listed above, and is further preferably 9.90 or less, 9.52 or less, 9.14 or less, 8.76 or less, 8.38 or less, or 8.00 or less in the order of the $CD_{nominal}$ numerical values as listed above.

Figure 10:
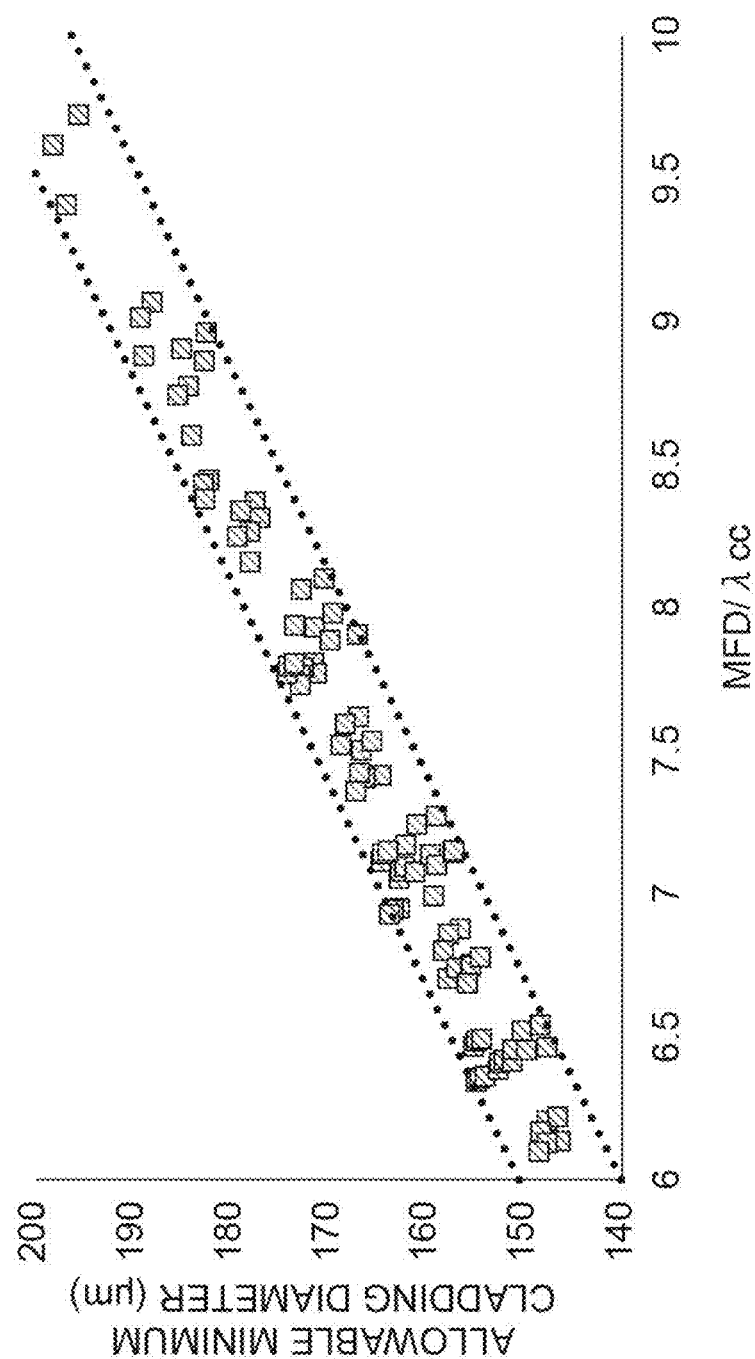
FIG. 10 is a graph illustrating a relationship between the CD and MFD/$\lambda_{cc}$ of a case where a margin of 1 μm is added to $d_{coat}$ when the leakage loss to the coating at the wavelength of 1360 nm is 0.01 dB/km and a margin of 1 μm is added to Λ when the counter propagation XT at the wavelength of 1360 nm after the propagation for 10 km (corresponding to the fiber length of 10 km) is −40 dB (=−40 dB/10 km), in the 12-core MCF.

FIG. 10 is a graph illustrating a relationship between the CD and $MFD/\lambda_{cc}$ of a case where a margin of 1 μm is added to $d_{coat}$ when the leakage loss to the coating at the wavelength of 1360 nm is 0.01 dB/km, and a margin of 1 μm is added to Λ when counter propagation XT at the wavelength of 1360 nm after the propagation for 10 km (corresponding to the fiber length of 10 km) is −40 dB (=−40 dB/10 km), in the 12-core MCF in which 12 cores are arranged to constitute the square lattice.

In consideration of the tolerances in the dimensions of the core position and the cladding diameter, in order to set the leakage loss to the resin coating at the wavelength of 1360 nm to 0.01 dB/km or less and to set the counter propagation XT to −40 dB or less after the propagation for 10 km (corresponding to the fiber length of 10 km), the relationship between $CD_{nominal}$ and $MFD/\lambda_{cc}$ satisfies at least one of the following Formula (113) and Formula (114) (a region above a lower dotted line illustrated in FIG. 10):

$$CD_{nominal} \geq 14.07 MFD/\lambda_{cc} + 55.59; \text{ and} \qquad (113)$$

$$MFD/\lambda_{cc} \leq 0.07105 CD_{nominal} - 3.950. \qquad (114)$$

Furthermore, the relationship between $CD_{nominal}$ and $MFD/\lambda_{cc}$ preferably satisfies at least one of the following Formula (115) and Formula (116) (a region above an upper dotted line illustrated in FIG. 10):

$$CD_{nominal} \geq 14.07 MFD/\lambda_{cc} + 66.07; \text{ and} \qquad (115)$$

$$MFD/\lambda_{cc} \leq 0.07105 CD_{nominal} - 4.694. \qquad (116)$$

Note that in FIG. 10, in a case y represents the vertical axis and x represents the horizontal axis, the upper dotted line is given by y=14.07x+66.07 (x=7.105×10⁻²y−4.694), and the lower dotted line is given by y=14.07x+55.59 (x=7.105×10⁻²y−3.950).

Figure 11:
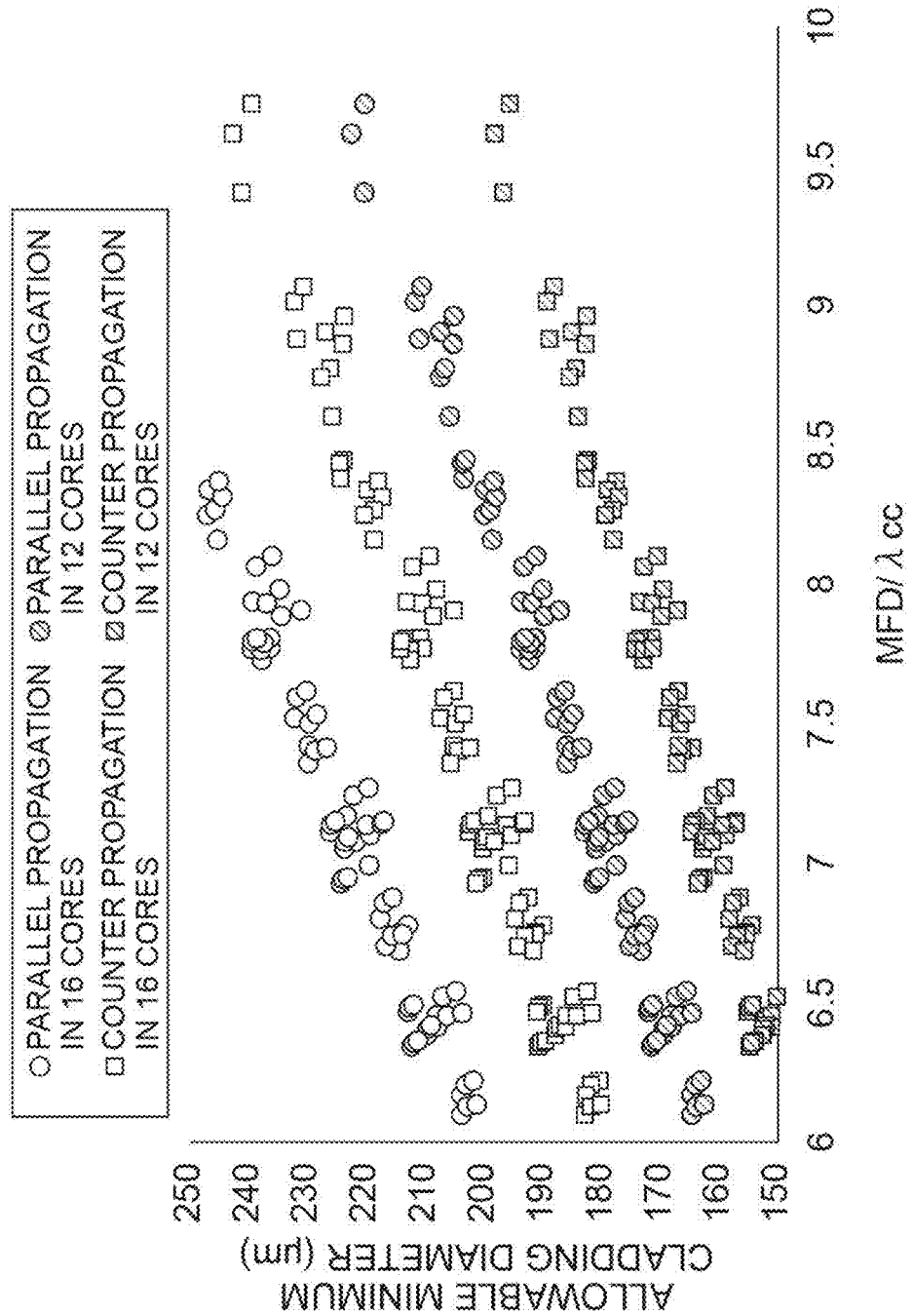
FIG. 11 is a graph illustrating a relationship between the CD and MFD/$\lambda_{cc}$ of a case where a margin of 1 μm is added to $d_{coat}$ and a margin of 1 μm is added to Λ when the leakage loss to the coating at the wavelength of 1360 nm is 0.01 dB/km, under a condition that the counter propagation XT at the wavelength of 1360 nm after the propagation for 10 km (corresponding to the fiber length of 10 km) is −40 dB (=−40 dB/10 km) or the parallel propagation XT after the propagation for 10 km (corresponding to the fiber length of 10 km) is −40 dB (=−40 dB/10 km), in the case of the 12-core MCF and in the case of the 16-core MCF.

FIG. 11 is a graph illustrating a relationship between CD and $MFD/\lambda_{cc}$ of a case where a margin of 1 μm is added to $d_{coat}$ when the leakage loss to the coating at the wavelength of 1360 nm is 0.01 dB/km, and a margin of 1 μm is added to Λ when the leakage loss to the coating at the wavelength of 1360 nm, under the condition that the counter propagation XT at the wavelength of 1360 nm after the propagation for 10 km (corresponding to the fiber length of 10 km) is −40 dB (=−40 dB/10 km) and the parallel propagation XT after the propagation for 10 kin (corresponding to the fiber length of 10 km) (XT at the general propagation in the identical direction) is −40 dB (=−40 dB/10 km), in the 12-core MCF in which 12 cores are arranged to constitute the square lattice and in the 16-core MCF in which 16 cores are arranged to constitute the square lattice. Note that in FIG. 11, the symbol "○" represents a relationship in the 16-core MCF for the parallel propagation between the adjacent cores, the symbol "□" represents a relationship in the 16-core MCF for the counter propagation between the adjacent cores, the symbol "● (indicated by oblique lines in FIG. 11)" represents a relationship in the 12-core MCF for the parallel propagation between the adjacent cores, and a symbol "■ (indicated by oblique lines in FIG. 9)" represents a relationship in the 12-core MCF for the counter propagation between the adjacent cores.

As can be understood from FIG. 11, it is preferable to use the MCF according to the present disclosure for not the parallel propagation but for the counter propagation, because the CD can be reduced by a little more than 10 μm. It is preferable to use the 12-core MCF, because the CD can be reduced by 35 μm as compared with the 16-core MCF.

Note that although no broken line is displayed in FIG. 11, in a similar manner to the case of FIG. 10, in the 16-core MCF, in consideration of the tolerances in the dimensions of the core position and the cladding diameter, in order to set the leakage loss to the resin coating at the wavelength of 1360 nm to 0.01 dB/km or less and to set the parallel propagation XT to −40 dB or less after the propagation for 10 km (corresponding to the fiber length of 10 km), the relationship between the $CD_{nominal}$ and $MFD/\lambda_{cc}$ satisfies at least one of the following Formula (117) and Formula (118):

$$CD_{nominal} \geq 19.81 MFD/\lambda_{cc} + 74.42; \text{ and} \quad (117)$$

$$MFD/\lambda_{cc} \leq 0.05047 CD_{nominal} - 3.756. \quad (118)$$

Furthermore, the relationship between $CD_{nominal}$ and $MFD/\lambda_{cc}$ preferably satisfies at least one of the following Formula (119) and Formula (120):

$$CD_{nominal} \geq 19.81 MFD/\lambda_{cc} + 87.07; \text{ and} \quad (119)$$

$$MFD/\lambda_{cc} \leq 0.05047 CD_{nominal} - 4.394. \quad (120)$$

In order to set the counter propagation XT to −40 dB or less after the propagation for 10 km (corresponding to the fiber length of 10 km), the relationship between $CD_{nominal}$ and $MFD/\lambda_{cc}$ satisfies at least one of the following Formula (121) and Formula (122):

$$CD_{nominal} \geq 17.01 MFD/\lambda_{cc} + 70.37; \text{ and} \quad (121)$$

$$MFD/\lambda_{cc} \leq 0.05878 CD_{nominal} - 4.137. \quad (122)$$

Furthermore, the relationship between $CD_{nominal}$ and $MFD/\lambda_{cc}$ preferably satisfies at least one of the following Formula (123) and Formula (124):

$$CD_{nominal} \geq 17.01 MFD/\lambda_{cc} + 83.45; \text{ and} \quad (123)$$

$$MFD/\lambda_{cc} \leq 0.05878 CD_{nominal} - 4.906. \quad (124)$$

In the 12-core MCF, in order to set the parallel propagation XT to −40 dB or less after the propagation for 10 km (corresponding to the fiber length of 10 km), the relationship between $CD_{nominal}$ and $MFD/\lambda_{cc}$ satisfies at least one of the following Formula (125) and Formula (126):

$$CD_{nominal} \geq 16.24 MFD/\lambda_{cc} + 58.71; \text{ and} \quad (125)$$

$$MFD/\lambda_{cc} \leq 0.06159 CD_{nominal} - 3.616. \quad (126)$$

Furthermore, the relationship between $CD_{nominal}$ and $MFD/\lambda_{cc}$ preferably satisfies at least one of the following Formula (127) and Formula (128):

$$CD_{nominal} \geq 16.24 MFD/\lambda_{cc} + 68.86; \text{ and} \quad (127)$$

$$MFD/\lambda_{cc} \leq 0.06159 CD_{nominal} - 4.241. \quad (128)$$

In a case where the $CD_{nominal}$ is 195 μm, 190 μm, 185 μm, 180 μm, 175 μm, or 170 μm, in the 16-core MCF, in consideration of the tolerances in the dimensions of the core position and the cladding diameter, in order to set the leakage loss to the resin coating at the wavelength of 1360 nm to 0.01 dB/km or less and to set the parallel propagation XT to −40 dB or less after the propagation for 10 km (corresponding to the fiber length of 10 km), $MFD/\lambda_{cc}$ is preferably 6.09 or less, 5.83 or less, 5.58 or less, 5.33 or less, 5.08 or less, or 4.82 or less in the order of the $CD_{nominal}$ numerical values as listed above, and is preferably 5.45 or less, 5.19 or less, 4.94 or less, 4.69 or less, 4.44 or less, or 4.19 or less in the order of the $CD_{nominal}$ numerical values as listed above.

In the case where the $CD_{nominal}$ is 195 μm, 190 μm, 185 μm, 180 μm, 175 μm, or 170 μm, in the 16-core MCF, in consideration of the tolerances in the dimensions of the core position and the cladding diameter, in order to set the leakage loss to the resin coating at the wavelength of 1360 nm to 0.01 dB/km or less and to set the counter propagation XT to −40 dB or less after the propagation for 10 km (corresponding to the fiber length of 10 km), $MFD/\lambda_{cc}$ is preferably 7.33 or less, 7.03 or less, 6.74 or less, 6.44 or less, 6.15 or less, or 5.86 or less in the order of the $CD_{nominal}$ numerical values as listed above, and is preferably 6.56 or less, 6.26 or less, 5.97 or less, 5.68 or less, 5.38 or less, or 5.09 or less in the order of the $CD_{nominal}$ numerical values as listed above.

In a case where the $CD_{nominal}$ is 195 μm, 190 μm, 185 μm, 180 μm, 175 μm, or 170 μm, in the 12-core MCF, in consideration of the tolerances in the dimensions of the core position and the cladding diameter, in order to set the leakage loss to the resin coating at the wavelength of 1360 nm to 0.01 dB/km or less and to set the counter propagation XT to −40 dB or less after the propagation for 10 km (corresponding to the fiber length of 10 km), $MFD/\lambda_{cc}$ is preferably 8.39 or less, 8.09 or less, 7.78 or less, 7.47 or less, 7.16 or less, or 6.85 or less in the order of the $CD_{nominal}$ numerical values as listed above, and is preferably 7.77 or less, 7.46 or less, 7.15 or less, 6.85 or less, 6.54 or less, or 6.23 or less in the order of the $CD_{nominal}$ numerical values as listed above.

In the case where the $CD_{nominal}$ is 195 µm, 190 µm, 185 µm, 180 µm, 175 µm, or 170 µm, in the 12-core MCF, in consideration of the tolerances in the dimensions of the core position and the cladding diameter, in order to set the leakage loss to the resin coating at the wavelength of 1360 nm to 0.01 dB/km or less and to set the counter propagation XT to −40 dB or less after the propagation for 10 km (corresponding to the fiber length of 10 km), MFD/$\lambda_{cc}$ is preferably 9.91 or less, 9.55 or less, 9.19 or less, 8.84 or less, 8.48 or less, or 8.13 or less in the order of the $CD_{nominal}$ numerical values as listed above, and is preferably 9.16 or less, 8.80 or less, 8.45 or less, 8.09 or less, 7.74 or less, or 7.38 or less in the order of the $CD_{nominal}$ numerical values as listed above.

It is preferable that $\lambda_{cc}$ is 1260 nm or less, because a single mode operation on the O-band can be ensured. In this situation, it is preferable to set MFD/$\lambda_{cc}$ to 6.2 or more, because $\lambda_{cc}$ of 1260 nm or less and the MFD of 7.8 µm or more and 8.6 µm or less are both achievable. It is further preferable to set MFD/$\lambda_{cc}$ to 6.5 or more, because the $\lambda_{cc}$ of 1260 nm or less and the MFD of 8.2 µm or more and 9.0 µm or less are both achievable.

In addition, the $\lambda_{cc}$ is preferably 1360 nm or less. In this situation, a higher-order mode propagates 22 m or more on the O-band. However, it is preferable that unless the local bending or splicing at a short distance is repeated, the single mode operation can be practically ensured, and the fundamental mode is more strongly confined in the core. In addition, it is further preferable to set MFD/$\lambda_{cc}$ to 6.0 or more, because the $\lambda_{cc}$ of 1360 nm or less and the MFD of 8.2 µm or more and 9.0 µm or less are both achievable.

In these cases, MFD/$\lambda_{cc}$ preferably takes a value between an upper limit regulated from the $CD_{nominal}$ described above and a lower limit regulated from the range of the MFD and the $\lambda_{cc}$.

In a case where the tolerance of an absolute value of 0.4 µm is provided with the nominal value of the MFD set to $MFD_{nominal}$ and the tolerance of an absolute value of 12 nm is provided with the nominal value of the zero-dispersion wavelength $\lambda_0$ set to $\lambda_{0nominal}$, the value of MFD/$\lambda_{cc}$ becomes the minimum when the MFD is a value of $MFD_{nominal}$−0.4 µm and the $\lambda_0$ is a value of $\lambda_{0nominal}$−12 nm, and becomes the maximum when the MFD is a value of $MFD_{nominal}$+0.4 µm and the $\lambda_0$ is a value of $\lambda_{0nominal}$+12 nm. In this situation, regarding the "tolerance of MFD/$\lambda_{cc}$", an MCF structure is configured such that the difference between the upper limit value and the lower limit value of MFD/$\lambda_{cc}$ is preferably 1.9 or more, more preferably 2.5 or more, and further preferably 3.0 or more.

In practice, the parameter of the refractive index profile of each core (a, b, Δ1, Δ2, Δ3, or $a_{ESI}$, $\Delta1_{ESI}$, $\Delta2_{ESI}$, or the like) does not vary independently or randomly from the nominal value, but the refractive index profile of each core can be measured to adjust $a_{ESI}$ and b. Therefore, it is possible to reduce the tolerance of MFD/$\lambda_{cc}$. However, even in such a situation, it is preferable to have an MCF structure in which the difference between the upper limit value and the lower limit value of MFD/$\lambda_{cc}$ is preferably 1.0 or more, and more preferably 1.5 or more. Accordingly, the yield of the MCF can be improved to a level with sufficient manufacturability.

In a case where the $\lambda_{cc}$ of 1260 nm or less and the MFD falling within a range of 7.8 µm or more and 8.6 µm or less are both achieved, MFD/$\lambda_{cc}$ is 6.2 or more. Therefore, in order to ensure that the tolerance of MFD/$\lambda_{cc}$ is 1.0 or more, 1.5 or more, 1.9 or more, 2.5 or more, or 3.0 or more, it is preferable that the MCF structure allows the upper limit value of MFD/$\lambda_{cc}$, which is 7.2 or more, 7.7 or more, 8.1 or more, 8.7 or more, or 9.2 or more in the order of numerical values of the tolerance of MFD/$\lambda_{cc}$ as listed above. For this purpose, regarding the $CD_{nominal}$, in the 12-core MCF, in order to set the leakage loss to the resin coating at the wavelength of 1360 n, to 0.01 dB/km or less and to set the counter propagation XT at the wavelength of 1360 nm to −20 dB or less after the propagation for 10 km (corresponding to the fiber length of 10 km), an allowable $CD_{nominal}$ of a case where a margin is added to Λ and $d_{coat}$ is preferably 149 pin or more, 156 pin or more, 161 pin or more, 169 pin or more, or 175 pin or more in the order of the tolerance values of MFD/$\lambda_{cc}$ as listed above from Formula (97), and is further preferably 160 µm or more, 166 µm or more, 171 µm or more, 179 µm or more, or 186 µm or more in the order of numerical values of the tolerance of MFD/$\lambda_{cc}$ as listed above from Formula (99). In this situation, regarding $CD_{nominal}$, in the 12-core MCF, in order to set the leakage loss to the resin coating at the wavelength of 1360 nm to 0.01 dB/km or less and to set the counter propagation XT at the wavelength of 1360 nm to −40 dB or less after the propagation for 10 km (corresponding to the fiber length of 10 km), an allowable $CD_{nominal}$ of a case where a margin is added to Λ and $d_{coat}$ is preferably 157 µm or more, 164 µm or more, 170 µm or more, 178 µm or more, or 185 µm or more in the order of the tolerance numerical values of MFD/$\lambda_{cc}$ as listed above from Formula (113), and is further preferably 167 µm or more, 174 µm or more, 173 µm or more, 182 µm or more, or 189 µm or more in the order of numerical values of the tolerance of MFD/$\lambda_{cc}$ as listed above from Formula (115).

In a case where the $\lambda_{cc}$ of 1260 nm or less and the MFD falling within a range of 8.2 µm or more and 9.0 µm or less are both achieved, MFD/$\lambda_{cc}$ is 6.5 or more. Therefore, in order to ensure that the tolerance of MFD/$\lambda_{cc}$ is 1.0 or more, 1.5 or more, 1.9 or more, 2.5 or more, or 3.0 or more, it is preferable that the MCF structure allows the upper limit value of MFD/$\lambda_{cc}$, which is 7.5 or more, 8.0 or more, 8.4 or more, 9.0 or more, or 9.5 or more in the order of numerical values of the tolerance of MFD/$\lambda_{cc}$ as listed above. For this purpose, regarding $CD_{nominal}$, in the 12-core MCF, in a case where a margin is added to Λ and $d_{coat}$ so that the leakage loss to the resin coating at the wavelength of 1360 nm is 0.01 dB/km or less and the counter propagation XT at the wavelength of 1360 nm is −20 dB or less after the propagation for 10 km (corresponding to the fiber length of 10 km), an allowable $CD_{nominal}$ is preferably 153 µm or more, 159 µm or more, 165 µm or more, 173 µm or more, or 179 µm or more in the order of numerical values of the tolerance of MFD/$\lambda_{cc}$ as listed above from Formula (97), and is further preferably 163 µm or more, 170 µm or more, 175 µm or more, 183 µm or more, or 190 µm or more in the order of numerical values of the tolerance of MFD/$\lambda_{cc}$ as listed above from Formula (99). In this situation, regarding $CD_{nominal}$, in the 12-core MCF, in a case where a margin is added to Λ and $d_{coat}$ so that the leakage loss to the resin coating at the wavelength of 1360 nm is 0.01 dB/km or less and the counter propagation XT at the wavelength of 1360 nm is −40 dB or less after the propagation for 10 km (corresponding to the fiber length of 10 kin), an allowable $CD_{nominal}$ is preferably 161 µm or more, 168 µm or more, 174 µm or more, 182 µm or more, or 189 µm or more in the order of numerical values of the tolerance of MFD/$\lambda_{cc}$ as listed above from Formula (113), and is further preferably 172 µm or more, 179 µm or more, 184 µm or more, 193 µm or more, or 199

μm or more in the order of numerical values of the tolerance of MFD/$\lambda_{cc}$ as listed above from Formula (115).

In a case where the $\lambda_{cc}$ of 1360 nm or less and the MFD falling within a range of 8.2 μm or more and 9.0 μm or less are both achieved, MFD/$\lambda_{cc}$ is 6.0 or more. Therefore, in order to ensure that the tolerance of MFD/$\lambda_{cc}$ is at least 1.0, 1.5, 1.9, 2.5, or 3.0, it is preferable that the MCF structure allows the upper limit value of MFD/$\lambda_{cc}$, which is at least 7.0, 7.5, 7.9, 8.5, or 9.0 m the order of numerical values of the tolerance of MFD/$\lambda_{cc}$ as listed above. For this purpose, regarding $CD_{nominal}$, in the 12-core MCF, in a case where a margin is added to Λ and $d_{coat}$ so that the leakage loss to the resin coating at the wavelength of 1360 nm is 0.01 dB/km or less and the counter propagation XT at the wavelength of 1360 nm is −20 dB or less after the propagation for 10 km (corresponding to the fiber length of 10 km), an allowable $CD_{nominal}$ is preferably 146 μm or more, 153 μm or more, 158 μm or more, 166 μm or more, or 173 μm or more in the order of numerical values of the tolerance of MFD/$\lambda_{cc}$ as listed above from Formula (97), and is further preferably 157 μm or more, 164 μm or more, 169 μm or more, 177 μm or more, or 183 μm or more in the order of numerical values of the tolerance of MFD/$\lambda_{cc}$ as listed above from Formula (99). In this situation, regarding $CD_{nominal}$, in the 12-core MCF, in a case where a margin is added to Λ and $d_{coat}$ so that the leakage loss to the resin coating at the wavelength of 1360 nm is 0.01 dB/km or less and the counter propagation XT at the wavelength of 1360 nm is −40 dB or less after the propagation for 10 km (corresponding to the fiber length of 10 kin), an allowable $CD_{nominal}$ is preferably 154 μm or more, 161 μm or more, 167 μm or more, 175 μm or more, or 182 μm or more in the order of numerical values of the tolerance of MFD/$\lambda_{cc}$ as listed above from Formula (113), and is further preferably 165 μm or more, 170 μm or more, 176 μm or more, 184 μm or more, or 191 μm or more in the order of numerical values of the tolerance of MFD/$\lambda_{cc}$ as listed above from Formula (115).

In a case where the $\lambda_{cc}$ is more than 1260 nm and 1360 nm or less, in a configuration of FIG. 12 (a fiber that is not formed into a cable) of ITU-T G650.1 (March 2018), 20 m in a sample fiber of 22 m is bent with a bending radius of 140 mm or more, one spool of bending with a radius of 40 mm is added before and after the above 20 in segment, and $P_h$ represents an intensity of the higher-order mode and $P_f$ represents an intensity of the fundamental mode, when all modes are uniformly excited, a wavelength at which 10 $\log_{10}[P_h/(P_f+P_h)]=0.1$ dB is satisfied is measured as the $\lambda_{cc}$. However, in the MCF according to the present disclosure, a cutoff wavelength ($\lambda_{cc}R$) is preferably 1260 nm or less, when measured by bending the segment of 20 m in the sample fiber of 22 m with a radius of 60 mm or more and 100 mm or less that has been changed. Accordingly, the single mode operation on the O-band after cable installation can be ensured. In addition, the length $L_{sample}$ [m] of the sample fiber falls within a range of more than 22 in and 1000 m or less, $L_{sample}$-2 [m] is bent with a bending radius of 140 mm or more, and one spool of bending with a radius of 40 mm is added before and after the above $L_{sample}$-2 [m] segment. A measured cutoff wavelength ($\lambda_{ccL}$) is preferably 1260 nm or less. Accordingly, in the cable having a cable length $L_{sample}$ [m], the single mode operation on the O-band can be ensured.

In each core of the MCF according to the present disclosure, a bending loss at a wavelength of 1310 nm or more and 1360 nm or less is preferably 0.15 dB/turn or less at a bending radius of 10 mm, and is more preferably 0.02 dB/turn or less. Accordingly, even in a case where the MCF according to the present disclosure is formed in an ultra-high density cable of the intermittent-bonding ribbon type, an increase in loss after being formed into a cable can be suppressed.

In a case where an MCF cable that incorporates the MCF according to the present disclosure is linearly extended (at least a bending radius of 1 m or more), an average bending radius of the MCF mounted in the cable is preferably 0.14 m or less, and more preferably 0.10 m or less. In addition, regarding the MCF cable incorporating the MCF according to the present disclosure, an average bending radius of the MCF formed into the cable is preferably 0.14 m or more and 0.3 in or less. Accordingly, the XT can be reduced.

Further, regarding the MCF cable incorporating the MCF according to the present disclosure, the average bending radius of the MCF mounted in the cable is preferably 0.03 m or more, and more preferably 0.06 m or more. Accordingly, a loss caused by bending can be reduced.

Furthermore, the MCF cable incorporating the MCF according to the present disclosure is preferably an intermittent-bonding ribbon cable. Accordingly, the intermittent-bonding ribbon that is flexible can be formed into the cable while being spirally twisted, and the MCF can be formed into a cable with a small bending radius, so that the XT can be reduced.

The MCF cable incorporating the MCF according to the present disclosure is preferably a ribbon slot type cable, and preferably has a tension member at the center of the slot member. Accordingly, the bending radius of the MCF can be easily controlled, and the XT can be reduced. In addition, the provision of the tension member at the center of the slot member enables the cable to be bent in any direction, and the cable laying work can be easily performed.

Regarding the MCF cable incorporating the MCF according to the present disclosure, preferably, a tension member is provided inside a sheath without providing a slot member in a space inside the sheath. Accordingly, the space inside the sheath can be effectively used, and the number of cores per cross-sectional area of the MCF cable can be increased.

What is claimed is:
1. A multi-core optical fiber comprising:
multiple cores each extending along a central axis;
a common cladding covering each of the multiple cores, and having a refractive index lower than each refractive index of the multiple cores; and
a resin coating provided on an outer periphery of the common cladding, wherein
on a cross-section of the multi-core optical fiber, the cross-section being orthogonal to the central axis, the multiple cores are arranged such that no adjacent relationship is established between cores each having an adjacent relationship with any core,
on the cross-section, the multiple cores are respectively arranged at positions of line symmetry with respect to an axis that serves as a symmetric axis, that passes through a center of the common cladding intersecting with the central axis, and that intersects with none of the multiple cores,
an outer diameter of the resin coating defined on the cross-section falls within a range of 235 μm or more and 265 μm or less,
a diameter CD [μm] of the common cladding defined on the cross-section falls within a range of a value of $CD_{nominal}-1$ μm or more and a value of $CD_{nominal}+1$ μm with a value of 146 μm or more and 195 μm or less used as a nominal value $CD_{nominal}$[μm], a mode field diameter MFD [µm] of light at a wavelength of 1310 nm guided by the each core of the multiple cores falls within a range of a value of a wavelength reference value−0.4 µm or more and a value of the wavelength reference value+0.4 µm or less with a value in a range of 8.2 µm or more and 9.2 µm or less used as the wavelength reference value, a cable cutoff wavelength $\lambda_{cc}$ [nm] measured at a fiber length of 22 m is 1360 nm or less, a zero-dispersion wavelength of the each core of the multiple cores falls within a range of a value of a wavelength reference value−12 nm or more and a value of the wavelength reference value+12 nm or less with a value in a range of 1312 nm or more and 1340 nm or less used as the wavelength reference value, a dispersion slope at the zero-dispersion wavelength is 0.092 ps/(nm²·km) or less, a shortest distance $d_{coat}$ [µm] of respective distances from an interface between the resin coating and the common cladding to centers of the multiple cores satisfies a following Formula (1):

$$d_{coat} \geq 2.88 MFD/\lambda_{cc} + 5.36, \tag{1}$$

the multi-core optical fiber has a structure satisfying one of a first condition and a second condition, and has an optical characteristic satisfying any one of a third condition to a sixth condition, the first condition is that the each core of the multiple cores is in direct contact with the common cladding, the second condition is that optical claddings respectively corresponding to the multiple cores are respectively disposed between the multiple cores and the common cladding, and the optical claddings each have a relative refractive index difference Δ2 of −0.1% or more and 0.1% or less with respect to the common cladding, the third condition is that the multiple cores include 12 cores, for each of the 12 cores, a total crosstalk corresponding to the fiber length of 10 km from the cores having the adjacent relationship at a wavelength of 1360 nm is −6.8 dB or less, and a center-to-center interval Λ between the cores having the adjacent relationship satisfies a following Formula (2):

$$\Lambda \geq 2.34 MFD/\lambda_{cc} + 12.1, \tag{2}$$

and
the multi-core optical fiber satisfies a following Formula (3):

$$CD_{nominal} \geq 13.15 MFD/\lambda_{cc} + 54.25, \tag{3}$$

the fourth condition is that the multiple cores include 12 cores, for each of the 12 cores, the total crosstalk corresponding to the fiber length of 10 km from the cores having the adjacent relationship at the wavelength of 1360 nm is −16.8 dB or less, and the center-to-center interval Λ between the cores having the adjacent relationship satisfies a following Formula (4):

$$\Lambda \geq 2.73 MFD/\lambda_{cc} + 12.7, \tag{4}$$

and
the multi-core optical fiber satisfies a following Formula (5):

$$CD_{nominal} \geq 14.07 MFD/\lambda_{cc} + 55.59, \tag{5}$$

the fifth condition is that the multiple cores include 16 cores, for each of the 16 cores, a total crosstalk corresponding to the fiber length of 10 km from the cores having the adjacent relationship at the wavelength of 1360 nm is −6.8 dB or less, and the center-to-center interval Λ between the cores having the adjacent relationship satisfies a following Formula (6):

$$\Lambda \geq 2.34 MFD/\lambda_{cc} + 12.1, \tag{6}$$

and,
the multi-core optical fiber satisfies a following Formula (7):

$$CD_{nominal} \geq 15.77 MFD/\lambda_{cc} + 68.58, \tag{7}$$

and
the sixth condition is that the multiple cores include 16 cores, for each of the 16 cores, the total crosstalk corresponding to the fiber length of 10 km from the cores having the adjacent relationship at the wavelength of 1360 nm is −16.8 dB or less, and the center-to-center interval Λ between the cores having the adjacent relationship satisfies a following Formula (8):

$$\Lambda \geq 2.73 MFD/\lambda_{cc} + 12.7, \tag{8}$$

and
the multi-core optical fiber satisfies a following Formula (9):

$$CD_{nominal} \geq 17.01 MFD/\lambda_{cc} + 70.37. \tag{9}$$

2. The multi-core optical fiber according to claim 1, wherein
the multiple cores include the 12 cores, and
the 12 cores each belong to one of an inner peripheral core group and an outer peripheral core group, the inner peripheral core group including four cores to be arranged such that distances from centers of the four cores to the center of the common cladding are shortest in a design on the cross-section, the outer peripheral core group including eight cores each having the adjacent relationship with the four cores and being arranged such that the distances from centers of the eight cores to the center of the common cladding avoids being shortest in the design, the mode field diameter MFD [μm] at a wavelength of 1310 nm falls within a range of 8.2 μm or more and 9.0 μm or less, the cable cutoff wavelength $\lambda_{cc}$ [nm] is 1260 nm or less, and the multi-core optical fiber satisfies following Formula (10):

$$6.5 \leq MFD/\lambda_{cc} \leq 9.5 \leq 0.07606 CD_{nominal} - 4.126. \quad (10)$$

3. The multi-core optical fiber according to claim 1, wherein the multiple cores include the 12 cores, and the 12 cores each belong to one of an inner peripheral core group and an outer peripheral core group, the inner peripheral core group including four cores to be arranged such that distances from centers of the four cores to the center of the common cladding are shortest in a design on the cross-section, the outer peripheral core group including eight cores each having the adjacent relationship with the four cores and being arranged such that the distances from centers of the eight cores to the center of the common cladding avoids being shortest in the design, the total crosstalk from the core that has the adjacent relationship with any core and that belongs to the inner peripheral core group being −16.8 dB or less corresponding to the fiber length of 10 km at the wavelength of 1360 nm, the mode field diameter MFD [μm] at a wavelength of 1310 nm falls within a range of 7.8 μm or more and 8.6 μm or less, the cable cutoff wavelength $\lambda_{cc}$ [nm] is 1260 nm or less, and the multi-core optical fiber satisfies following Formula (11):

$$6.2 \leq MFD/\lambda_{cc} \leq 9.2 \leq 0.07105 CD_{nominal} - 3.950. \quad (11)$$

4. The multi-core optical fiber according to claim 1, wherein the multiple cores include the 12 cores, and the 12 cores each belong to one of an inner peripheral core group and an outer peripheral core group, the inner peripheral core group including four cores to be arranged such that distances from centers of the four cores to the center of the common cladding are shortest in a design on the cross-section, the outer peripheral core group including eight cores each having the adjacent relationship with the four cores and being arranged such that the distances from centers of the eight cores to the center of the common cladding avoids being shortest in the design, the total crosstalk from the core that has the adjacent relationship with any core and that belongs to the inner peripheral core group being −16.8 dB or less corresponding to the fiber length of 10 km at the wavelength of 1360 nm, the mode field diameter MFD at a wavelength of 1310 nm falls within a range of 8.2 μm or more and 9.0 μm or less, the cable cutoff wavelength $\lambda_{cc}$ [nm] is 1360 nm or less, and the multi-core optical fiber satisfies following Formula (12):

$$6.0 \leq MFD/\lambda_{cc} \leq 9.0 \leq 0.07105 CD_{nominal} - 3.950. \quad (12)$$

5. The multi-core optical fiber according to claim 1, wherein with respect to a nominal value $\Lambda_{nominal}$ [μm] of the center-to-center interval $\Lambda$, the center-to-center interval $\Lambda$ falls within a range of a following Formula (13):

$$\Lambda_{nominal} - 0.9 \leq \Lambda \leq \Lambda_{nominal} + 0.9, \quad (13)$$

and wherein in a state where either the third condition or the fifth condition is satisfied, the nominal value $\Lambda_{nominal}$ satisfies a following Formula (14):

$$\Lambda_{nominal} \geq 2.34 MFD/\lambda_{cc} + 12.1 + 1.0, \quad (14)$$

or in a state where either the fourth condition or the sixth condition is satisfied, the nominal value $\Lambda_{nominal}$ satisfies a following Formula (15):

$$\Lambda_{nominal} \geq 2.73 MFD/\lambda_{cc} + 12.7 + 1.0. \quad (15)$$

6. The multi-core optical fiber according to claim 1, wherein the total crosstalk corresponding to the fiber length of 10 km from the core that has the adjacent relationship at the wavelength of 1550 nm is −15 dB or more.

7. A multi-core optical fiber cable comprising a plurality of multi-core optical fibers including the multi-core optical fiber defined in claim 1.

8. The multi-core optical fiber cable according to claim 7, wherein the multi-core optical fiber has an average bending radius of 0.03 m or more and 0.14 m or less, or 0.14 m or more and 0.3 m or less in a fiber longitudinal direction.

9. A multi-core optical fiber cable incorporating a multi-core optical fiber ribbon obtained by intermittently bonding a plurality of multi-core optical fibers including the multi-core optical fiber defined in claim 1.

10. The multi-core optical fiber cable according to claim 9, wherein the multi-core optical fiber ribbon is incorporated with spirally twisted.

* * * * *